(12) United States Patent
Mitarai et al.

(10) Patent No.: US 8,238,673 B2
(45) Date of Patent: Aug. 7, 2012

(54) PATTERN IDENTIFICATION APPARATUS AND METHOD THEREOF, ABNORMAL PATTERN DETECTION APPARATUS AND METHOD THEREOF, AND PROGRAM

(75) Inventors: Yusuke Mitarai, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1154 days.

(21) Appl. No.: 12/100,664

(22) Filed: Apr. 10, 2008

(65) Prior Publication Data

US 2008/0253665 A1  Oct. 16, 2008

(30) Foreign Application Priority Data

Apr. 11, 2007  (JP) ................................. 2007-104212

(51) Int. Cl.
  *G06K 9/70* (2006.01)
(52) U.S. Cl. ......... 382/227; 382/159; 382/181; 382/224
(58) Field of Classification Search .................. 382/100, 382/154, 155, 159, 190, 181, 224
  See application file for complete search history.

(56) References Cited

U.S. PATENT DOCUMENTS

| 7,526,123 B2 * | 4/2009 | Moon et al. ................... 382/159 |
| 7,899,253 B2 * | 3/2011 | Porikli et al. .................. 382/190 |
| 8,045,805 B2 * | 10/2011 | Ramsay et al. ............... 382/190 |
| 2008/0063264 A1 * | 3/2008 | Porikli et al. .................. 382/159 |
| 2009/0132213 A1 * | 5/2009 | Zhao et al. ........................ 703/2 |

FOREIGN PATENT DOCUMENTS

| JP | 2003-030172 | 1/2003 |
| JP | 2005-535017 | 11/2005 |

OTHER PUBLICATIONS

Bernhard Scholkopf, Alexander Smola, and Klaus-Robert Muller, "Nonlinear Component Analysis as a Kernel Eigenvalue Problem", Neural Computation, vol. 10, pp. 1299-1319, 1998.

Jorma Laaksonen, "Local Subspace Classifier", Proceedings of 7th International Conference on Artificial Neural Networks, pp. 637-642, 1997.

Joshua B. Tenenbaum, Vin de Silva, and John C. Langford, "A Global Geometric Framework for Nonlinear Dimensionality Reduction", Science, vol. 290, pp. 2319-2323, 2000.

(Continued)

*Primary Examiner* — Stephen R Koziol
(74) *Attorney, Agent, or Firm* — Cowan, Liebowitz & Latman, P.C.

(57) ABSTRACT

A pattern identification apparatus for identifying one of a plurality of classes defined in advance, to which data of a pattern identification target belongs, comprises a read unit adapted to read out, from a storage unit in correspondence with each of the plurality of classes, a projection rule to a hyperplane which approximates a manifold corresponding to the class in a feature space an input unit adapted to input identification target data; a calculation unit adapted to calculate, for each class, a projection result obtained by projecting the input identification target data to the hyperplane which approximates the manifold corresponding to each of the plurality of classes, on the basis of the projection rule; and an identification unit adapted to identify, on the basis of the projection result of each classes calculated by said calculation unit, one of the plurality of classes to which the identification target data belongs.

15 Claims, 12 Drawing Sheets

OTHER PUBLICATIONS

Sam T. Roweis and Lawrence K. Saul, "Nonlinear Dimensionality Reduction by Locally Linear Embedding", Science, vol. 290, pp. 2323-2326, 2000.

Bisser Raytchev, Ikushi Yoda, and Katsuhiko Sakaue, "Multi-View Face Recognition by Nonlinear Dimensionality Reduction and Generalized Linear Models", Proceedings of 7th International Conference on Automatic Face Gesture Recognition, pp. 625-630, 2006.

Alan Edelman, Tomas Arias, and Steven T. Smith, "The Geometry of Algorithms with Orthogonality Constraints", Society for Industrial and Applied Mathematics Journal on Matrix Analysis and Applications, vol. 20, pp. 303-353, 1998.

Mikhail Belkin and Partha Niyogi, "Laplacian Eigenmaps and Spectral Techniques for Embedding and Clustering", Advances in Neural Information Processing Systems 14, MIT Press, Cambridge MA 2002.

\* cited by examiner

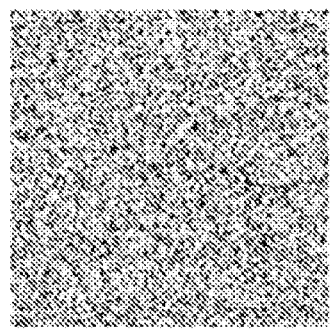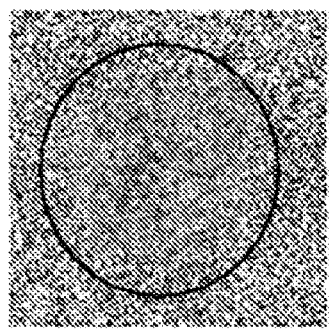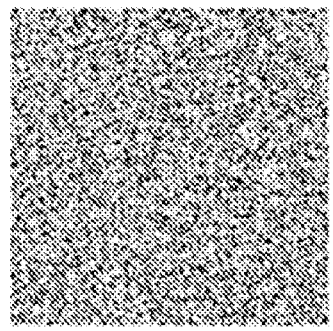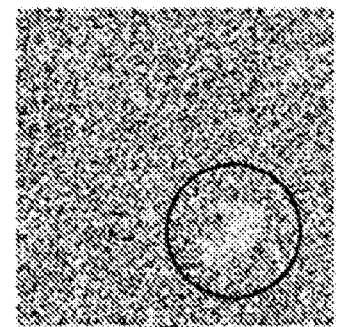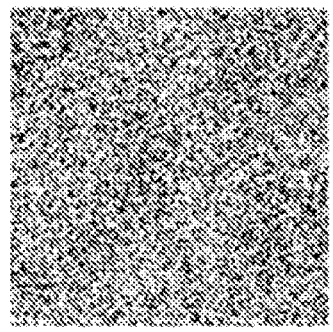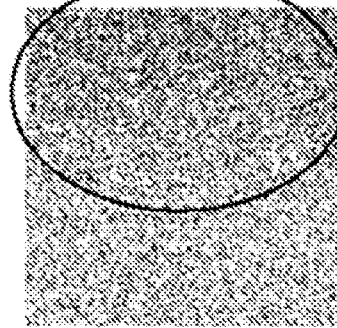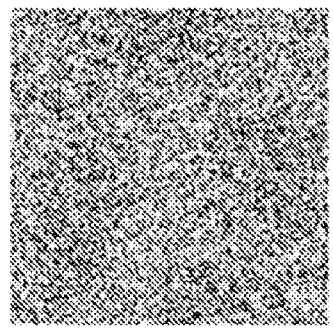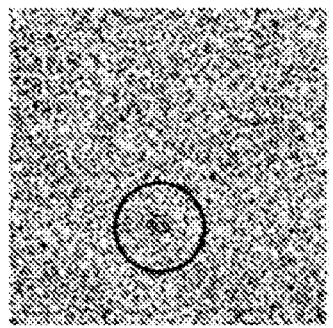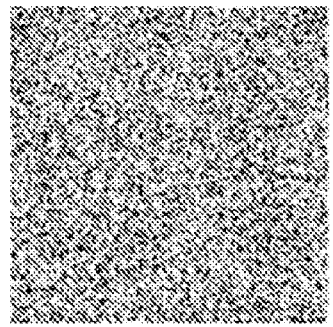

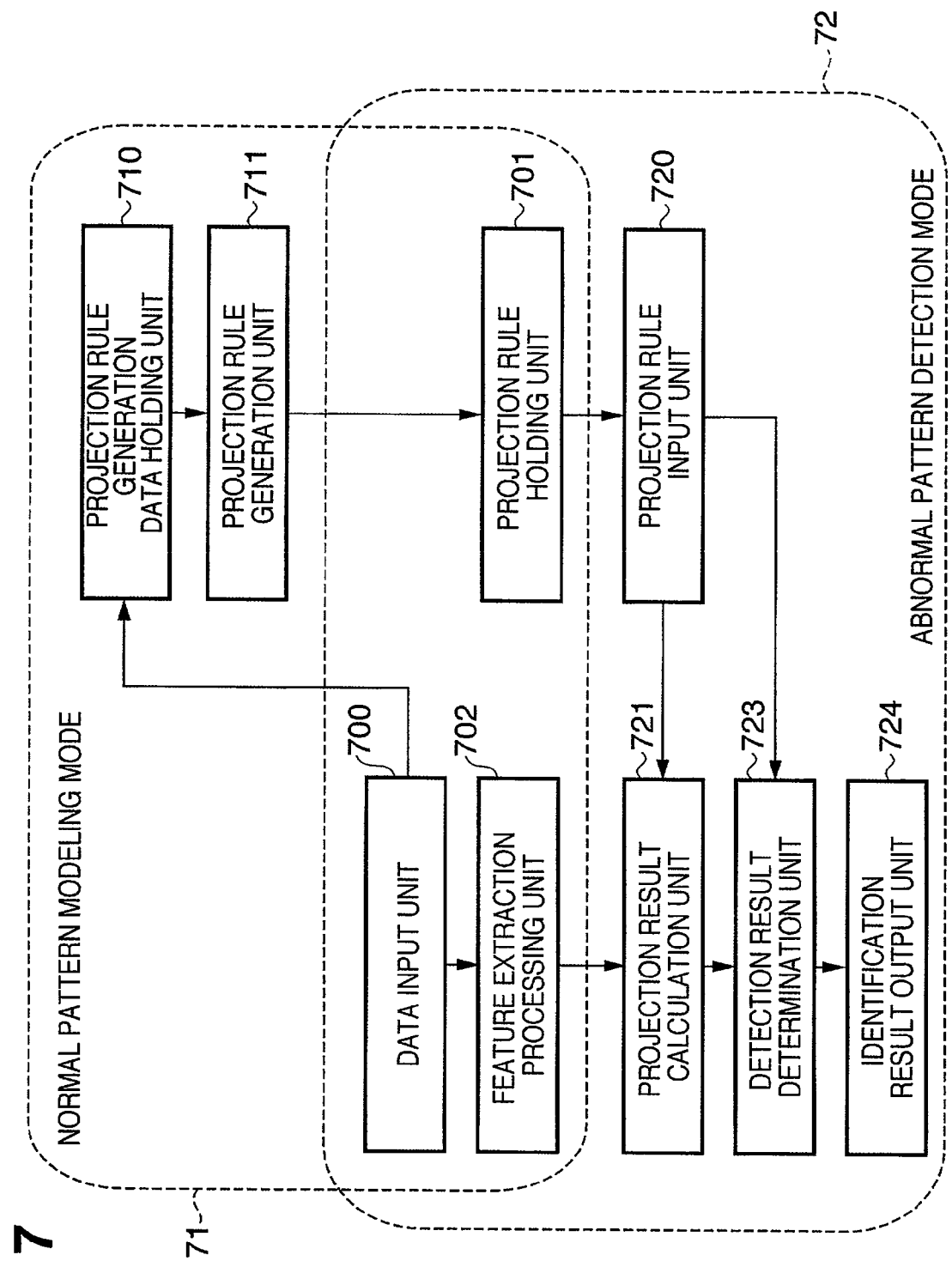

PATTERN IDENTIFICATION APPARATUS AND METHOD THEREOF, ABNORMAL PATTERN DETECTION APPARATUS AND METHOD THEREOF, AND PROGRAM

BACKGROUND OF THE INVENTION

1. Field of the Invention

The present invention relates to a pattern identification apparatus and a method thereof, an abnormal pattern detection apparatus and a method thereof, and a program. Particularly, the present invention relates to a pattern identification technique and an abnormal pattern detection technique, which are robust against various kinds of variations, in a pattern to be identified, caused by a difference in a data acquisition environment or noise added upon data acquisition.

2. Description of the Related Art

A so-called pattern identification technique of identifying one of a plurality of predefined classes to which input data belongs is known. Various methods have been proposed as pattern identification techniques robust against various kinds of input pattern variations caused by, for example, a difference in a data acquisition environment or noise added upon data acquisition.

A subspace method is disclosed in S. Watanabe and N. Pakvasa, "Subspace Method of Pattern Recognition", Proceedings of 1st International Joint Conference of Pattern Recognition, pp. 25-32, 1973 (Watanabe-Pakvasa). A kernel nonlinear subspace method that has improved the above subspace method is disclosed in Eisaku Maeda and Hiroshi Murase, "Pattern Recognition by Kernel Nonlinear Subspace Method", IEICE Transactions D-II, Vol. J82-D-II No. 4, pp. 600-612, April 1999 (Maeda-Murase hereinafter). A kernel nonlinear mutual subspace method is disclosed in Hitoshi Sakano, Naoki Takegawa, and Taichi Nakamura, "Object Recognition by Kernel Nonlinear Mutual Subspace Method", IEICE Transactions D-II, Vol. J84-D-II No. 8, pp. 1549-1556, August 2001 (Sakano-Takegawa-Nakamura hereinafter). In these methods, first, subspaces including the data sets of the respective classes are obtained using principal component analysis or kernel nonlinear principal component analysis described in Bernhard Scholkopf, Alexander Smola, and Klaus-Robert Muller, "Nonlinear Component Analysis as a Kernel Eigenvalue Problem", Neural Computation, Vol. 10, pp. 1299-1319, 1998 (Scholkopf-Smola-Muller hereinafter). The subspaces are compared with input data or a subspace obtained from input data, thereby identifying which class includes the input pattern.

In a method disclosed in Jorma Laaksonen, "Local Subspace Classifier", Proceedings of 7th International Conference on Artificial Neural Networks, pp. 637-642, 1997, (Laaksonen hereinafter), first, the linear subspaces of the respective classes are formed using, of the data of the respective classes, only neighboring data of input identification target data. The projection distance of the input identification target data to each subspace is obtained. The projection distances of the classes are compared, thereby identifying which class includes the identification target data. Such a method using only neighboring local data can reduce the adverse effect generated by the nonlinear data distribution.

On the other hand, nonlinear dimension compression methods have been proposed recently, which are represented by Isomap disclosed in Joshua B. Tenenbaum, Vin de Silva, and John C. Langford, "A Global Geometric Framework for Nonlinear Dimensionality Reduction", Science, Vol. 290, pp. 2319-2323, 2000 (Tenenbaum-Silva-Langford hereinafter) and LLE (Locally Linear Embedding) disclosed in Sam T. Roweis and Lawrence K. Saul, "Nonlinear Dimensionality Reduction by Locally Linear Embedding", Science, Vol. 290, pp. 2323-2326, 2000 (Roweis-Saul hereinafter). These prior art works provide a method of mapping data, which is supposed to exist on a lower-dimensional hypersurface generally called a manifold in a high-dimensional space, onto a new low-dimensional space which maintains the surface shape unique to the manifold to an acceptable level.

The above-described methods are successful in efficient pattern expression in the sense that they can express data in a lower-dimensional space. However, their methods are not always optimal because they do not use information representing which class includes data.

Japanese Patent Laid-Open No. 2005-535017 discloses an arrangement for expressing an image for pattern classification by extending the conventional Isomap method using a kernel Fisher linear discriminant function or Fisher linear discriminant function. Bisser Raytchev, Ikushi Yoda, and Katsuhiko Sakaue, "Multi-View Face Recognition By Nonlinear Dimensionality Reduction and Generalized Linear Models", Proceedings of 7th International Conference on Automatic Face Gesture Recognition, pp. 625-630, 2006, (Raytchev-Yoda-Sakaue hereinafter) discloses, as an improvement of the conventional Isomap method, a method of forming a mapping which increases the degree of separation between classes by forcibly increasing the geodesic distance between data belonging to different classes.

In the above-described conventional arrangements, however, it is difficult to identify a pattern which cannot undergo simple modeling because it has a complex distribution in the original feature space in accordance with various variations in input data, including variations in the illumination condition and the position and direction of a pattern recognition target. This has produced a demand for increasing the robustness against various variations in input data.

This will be described briefly. Assume that a gray-scale image of an extracted human face including, for example, 20×20 pixels is input to identify the person to whom the face image belongs. In this case, the 20×20 pixel gray-scale image can be regarded as a 20×20=400-dimensional vector with pixel values being arranged as elements by raster scan. At this time, one pattern corresponds to one point in the 400-dimensional space. Generally, a set of patterns for a specific class, for example, "face of Mr. A" forms a hypersurface generally called a manifold which has a smaller number of dimensions as compared to the 400-dimensional space. That is, 400 dimensions are redundant for expressing "face of Mr. A", and a lower-dimensional space suffices.

The Watanabe-Pakvasa's subspace method executes pattern identification to determine which class includes input data using such a characteristic that a lower-dimensional space can express the data set of a certain class. In the subspace method, PCA (Principal Component Analysis) is applied to each of the data sets of the respective classes, thereby obtaining in advance a lower-dimensional subspace that expresses the data set of each class. A pattern is identified using the manner in which the input data is expressed in the subspace. More specifically, the projection lengths or projection distances of the input data to the subspaces are compared, thereby identifying the class which includes (or does not include) the input data. However, the PCA which assumes a normal pattern distribution cannot always obtain a sufficient low-dimensional expression for a set of patterns essentially including nonlinear variations such as a variation in the face direction.

The Maeda-Murase kernel nonlinear subspace method can even cope with a data set having a nonlinear distribution by replacing the PCA in the subspace method with the Scholkopf-Smola-Muller kernel nonlinear principal component analysis. The kernel nonlinear principal component analysis is generally called KPCA (Kernel PCA). However, even KPCA cannot always obtain a low-dimensional expression that approximates a manifold structure formed by the data set of a certain class.

The arrangements described in the remaining references are also required to further improve the robustness against various variations in input data.

SUMMARY OF THE INVENTION

The present invention has been made in consideration of the above problems, and has as its object to provide a pattern recognition technique having a further improved robustness against variations in input data. It is another object of the present invention to provide an abnormal pattern detection technique using the pattern recognition technique.

According to one aspect of the present invention, a pattern identification apparatus for identifying one of a plurality of classes defined in advance, to which data of a pattern identification target belongs, comprises:

a read unit adapted to read out, from a storage unit in correspondence with each of the plurality of classes, a projection rule to a hyperplane which approximates a manifold corresponding to the class in a feature space;

an input unit adapted to input identification target data;

a calculation unit adapted to calculate, for each class, a projection result obtained by projecting the input identification target data to the hyperplane which approximates the manifold corresponding to each of the plurality of classes, on the basis of the projection rule; and an identification unit adapted to identify, on the basis of the projection result of each classes calculated by said calculation unit, one of the plurality of classes to which the identification target data belongs.

According to another aspect of the present invention, an abnormal pattern detection apparatus comprises:

a read unit adapted to read out, from a storage unit, a projection rule to a hyperplane which approximates a manifold corresponding to a class defined in advance in a feature space;

an input unit adapted to input process target data;

a calculation unit adapted to calculate a projection result obtained by projecting the input process target data to the hyperplane which approximates the manifold corresponding to the class, on the basis of the projection rule; and a detection unit adapted to detect, on the basis of the projection result calculated by said calculation unit, whether the process target data is abnormal.

According to still another aspect of the present invention, a pattern identification method for identifying one of a plurality of classes defined in advance, to which data of a pattern identification target belongs, comprises the steps of:

reading out, from a storage unit in correspondence with each of the plurality of classes, a projection rule to a hyperplane which approximates a manifold corresponding to the class in a feature space;

inputting identification target data;

calculating, for each class, a projection result obtained by projecting the input identification target data to the hyperplane which approximates the manifold corresponding to each of the plurality of classes, on the basis of the projection rule; and identifying, on the basis of the projection result of each class calculated in the step of calculating, one of the plurality of classes to which the identification target data belongs.

According to yet another aspect of the present invention, an abnormal pattern detection method comprises the steps of:

reading out, from a storage unit, a projection rule to a hyperplane which approximates a manifold corresponding to a class defined in advance in a feature space;

inputting process target data;

calculating a projection result obtained by projecting the input process target data to the hyperplane which approximates the manifold corresponding to the class, on the basis of the projection rule; and detecting, on the basis of the projection result calculated in the step of calculating, whether the process target data is abnormal.

Further features of the present invention will become apparent from the following description of exemplary embodiments (with reference to the attached drawings).

BRIEF DESCRIPTION OF THE DRAWINGS

FIGS. 6A to 6J are views showing examples of process target patterns;

FIG. 7 is a block diagram showing the functional arrangement of an abnormal pattern detection apparatus;

DESCRIPTION OF THE EMBODIMENTS

The embodiments of the present invention will now be described in detail with reference to the accompanying drawings. The constituent elements described in the embodiments are merely examples and do not limit the scope of the present invention. Additionally, not all combinations of features described in the embodiments are essential in the solving means of the present invention.

<<First Embodiment>>

In this embodiment, an example of an arrangement which inputs a gray-scale image of an extracted human face including, for example, 20×20 pixels and identifies the person to whom the face image belongs will be described. However, the image size to which the arrangement of this embodiment is applicable is not limited to this.

As described above, the 20×20 pixel gray-scale image can be regarded as a 20×20=400-dimensional vector. In this case, one pattern corresponds to one point in the 400-dimensional space. A set of patterns for a specific class forms a hypersurface (manifold) which has a smaller number of dimensions as compared to the 400-dimensional space. Hence, the set of patterns for a specific class such as "face of Mr. A" can be expressed by a lower-dimensional space than the 400-dimensional space.

Generally, a low-dimensional expression that approximates a manifold structure expresses a degenerated hyperplane or hypersurface in the original feature space, which approximates a pattern distribution in the original feature space. Hence, in this embodiment, a low-dimensional expression that approximates a manifold structure formed by the data set of a certain class is used. An arrangement for identifying the pattern of input data based on the manner the input data is expressed in the low-dimensional expression will be described.

(Hardware Configuration of Pattern Identification Apparatus)

Figure 12:
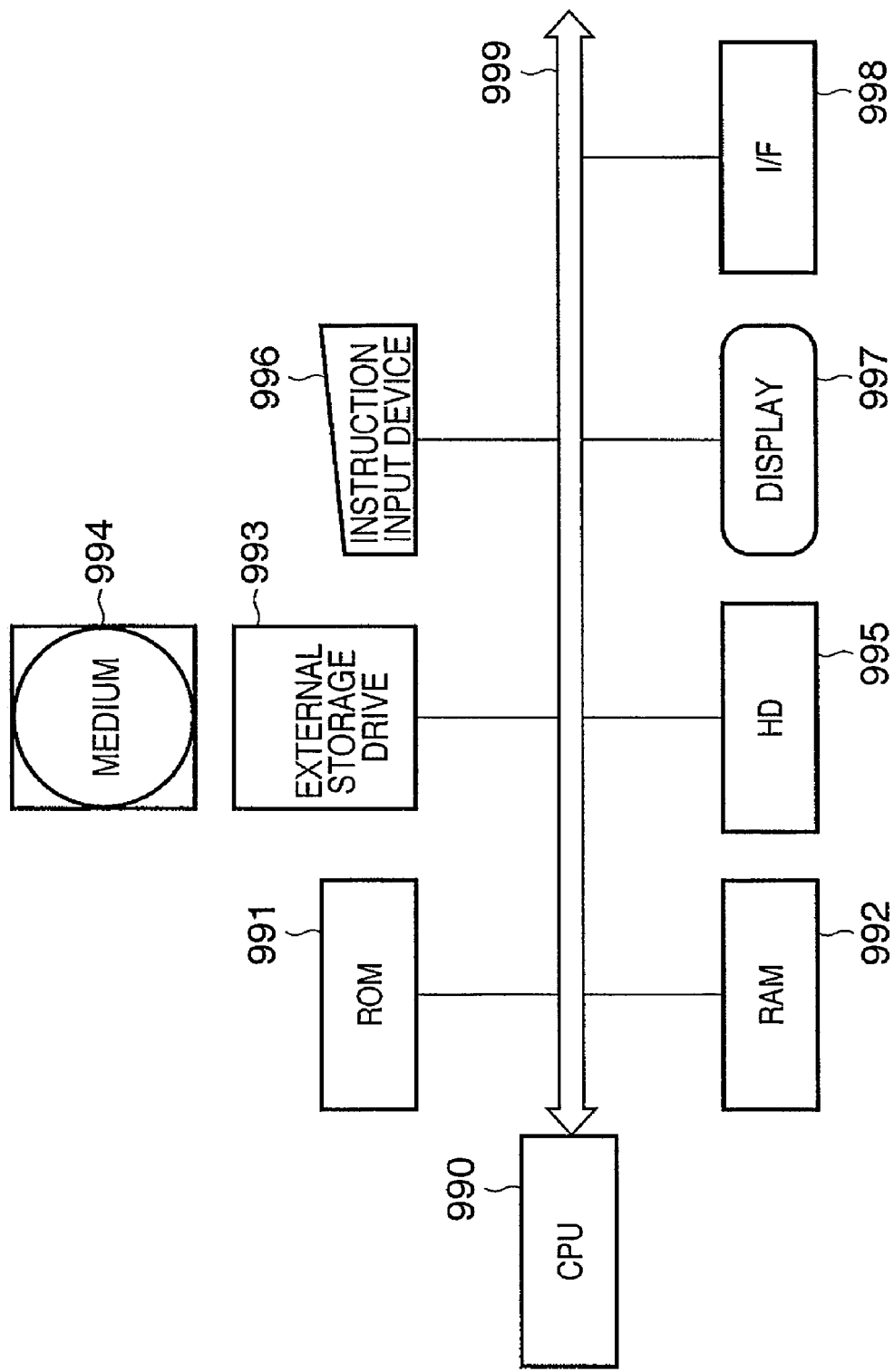
FIG. 12 is a block diagram schematically showing the hardware configuration of a pattern identification apparatus.

The hardware configuration of a pattern identification apparatus according to this embodiment will be described next with reference to FIG. 12. FIG. 12 is a block diagram schematically showing the hardware configuration of the pattern identification apparatus according to this embodiment. The pattern identification apparatus of this embodiment is implemented by, for example, a personal computer (PC), workstation (WS), or personal digital assistant (PDA).

Referring to FIG. 12, reference numeral 990 denotes a CPU. The CPU 990 executes application programs, operating system (OS), and control programs stored in a hard disk device 995 (to be described later) and temporarily stores, in a RAM 992, information and files necessary for program execution.

A ROM 991 stores programs such as a basic I/O program, and various kinds of data including font data and template data to be used for fundamental processes. The RAM 992 temporarily stores various kinds of data and functions as the main memory or work area of the CPU 990.

An external storage drive 993 which implements access to a recording medium can load a program or the like from a medium (recording medium) 994 to the computer system. The medium 994 includes, for example, a flexible disk (FD), CD-ROM, CD-R, CD-RW, PC card, DVD, IC memory card, MO, and memory stick.

In this embodiment, a hard disk device (to be referred to as an HD hereinafter) functioning as a mass storage is used as the external storage device 995. The HD 995 stores application programs, OS, control programs, associated programs, and the like.

An instruction input device 996 corresponds to a keyboard, pointing device (e.g., mouse), or touch panel. The user inputs, for example, a command to the pattern identification apparatus of this embodiment to control it.

A display 997 displays, for example, a command input from the instruction input device 996 or an output from the pattern identification apparatus in response to the command.

A system bus 999 controls the data flow in the pattern identification apparatus. Reference numeral 998 denotes an interface (to be referred to as an I/F hereinafter). Data is sent/received to/from an external device via the I/F 998.

Software which implements the same functions as those of the above-described devices may substitute for the hardware devices.

This embodiment assumes an example in which programs and associated data according to the embodiment are directly loaded in the RAM 992 and executed. However, the present invention is not limited to this. For example, every time a program according to the embodiment should run, it may be loaded from the HD 995, in which the program is already installed, to the RAM 992. Alternatively, a program according to the embodiment may be recorded in the ROM 991 in advance as part of a memory map so that the CPU 990 can directly execute it.

In this embodiment, the pattern identification apparatus according to the embodiment is implemented by a single apparatus, for descriptive convenience. However, the resources may be distributed to a plurality of apparatuses. For example, storage and arithmetic resources may be distributed to a plurality of apparatuses. Alternatively, the resources may be distributed in accordance with the constituent elements virtually implemented on the pattern identification apparatus to executed a parallel process.

(Functional Arrangement of Pattern Identification Apparatus)

Figure 1:
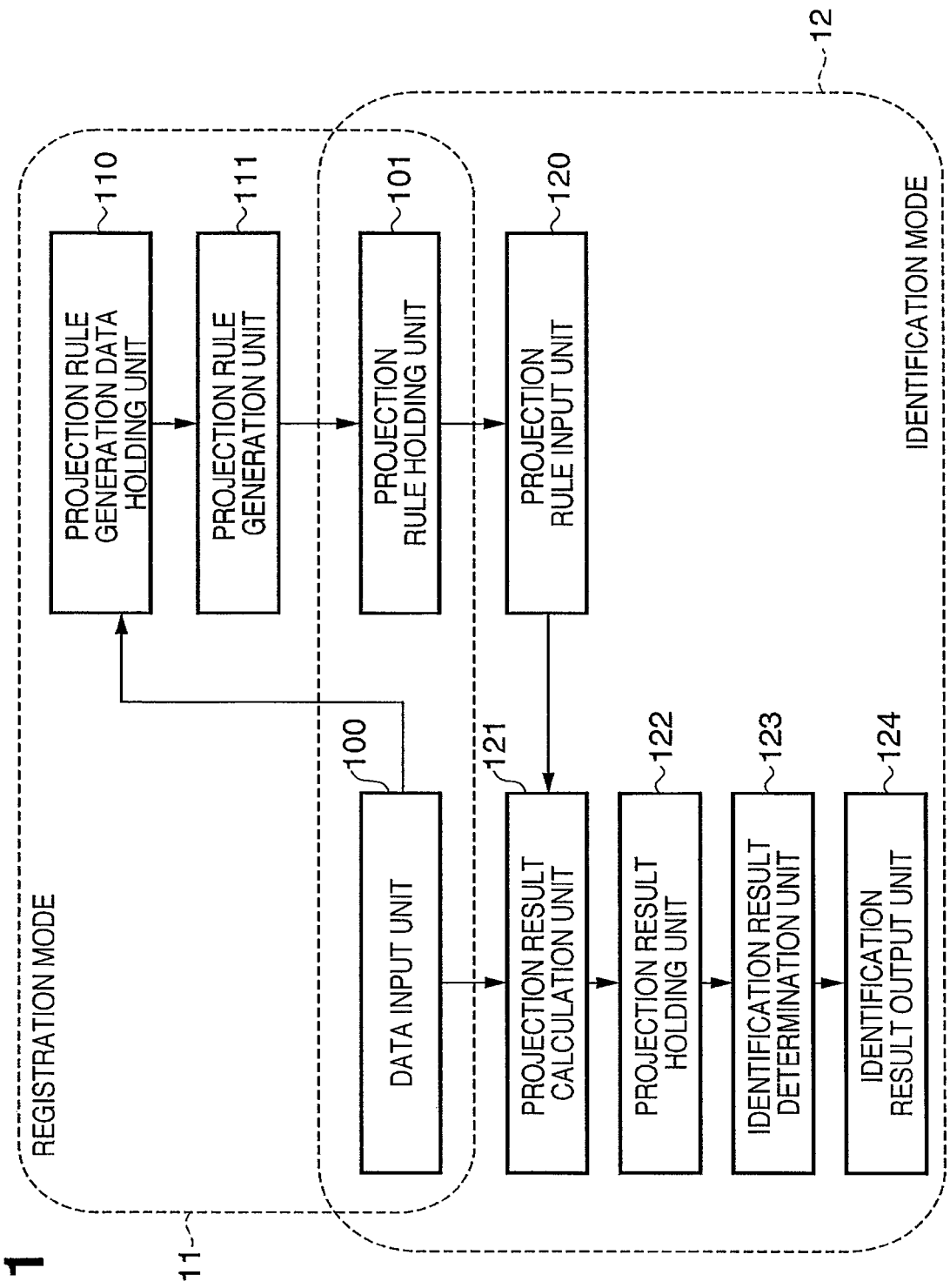
FIG. 1 is a block diagram showing the functional arrangement of a pattern identification apparatus.

A functional arrangement for causing the pattern identification apparatus to execute a pattern identification process will be described next with reference to FIG. 1. FIG. 1 is a block diagram showing the functional arrangement of the pattern identification apparatus.

The CPU 990 of the pattern identification apparatus described above with reference to FIG. 12 executes a program loaded in the RAM 992 and cooperates with the hardware shown in FIG. 12, thereby implementing the functional blocks shown in FIG. 1. Some or all of the functional blocks may be implemented by dedicated hardware, as a matter of course.

As shown in FIG. 1, the pattern identification apparatus of this embodiment has a registration mode process block 11 and an identification mode process block 12. The process in the registration mode corresponds to a process of inputting the face image data of a plurality of persons of registration targets and generating, for each person, a projection rule to a low-dimensional expression space that approximates a manifold structure. On the other hand, the process in the identification mode corresponds to a process of inputting the face image data of a person of an identification target and identifying the person to whom the face image belongs using the projection rules of the respective persons generated in the registration mode.

Figure 2:
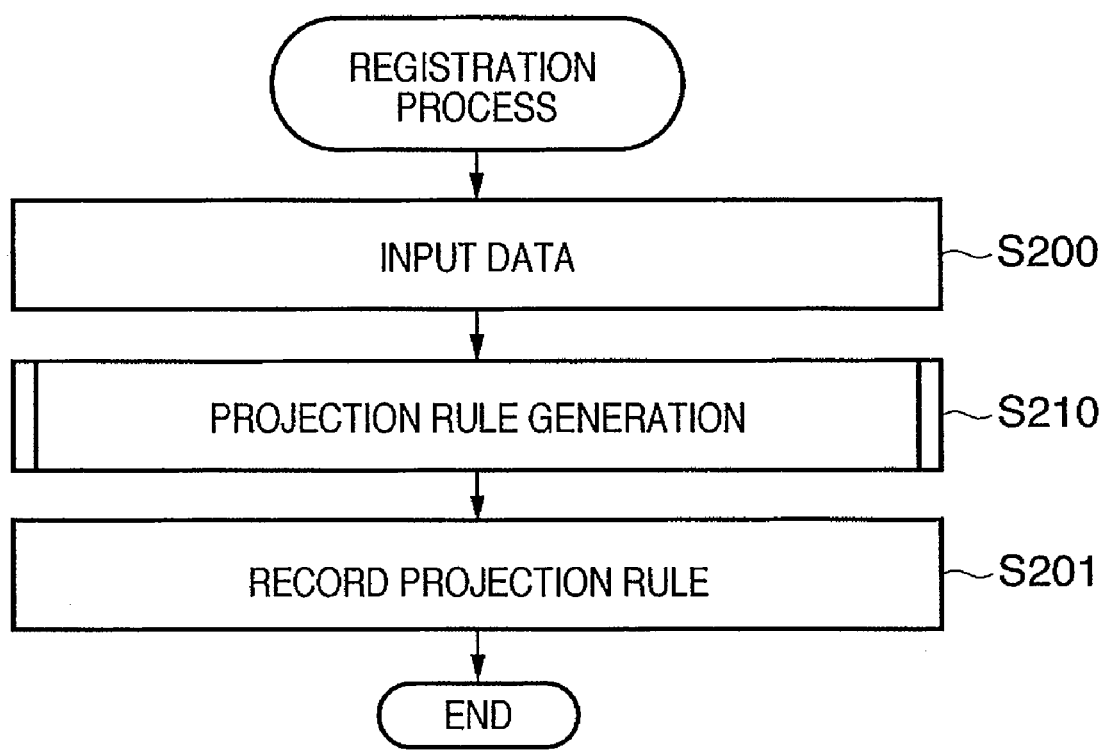
FIG. 2 is a flowchart illustrating the sequence of a process in a registration mode.
Figure 3:
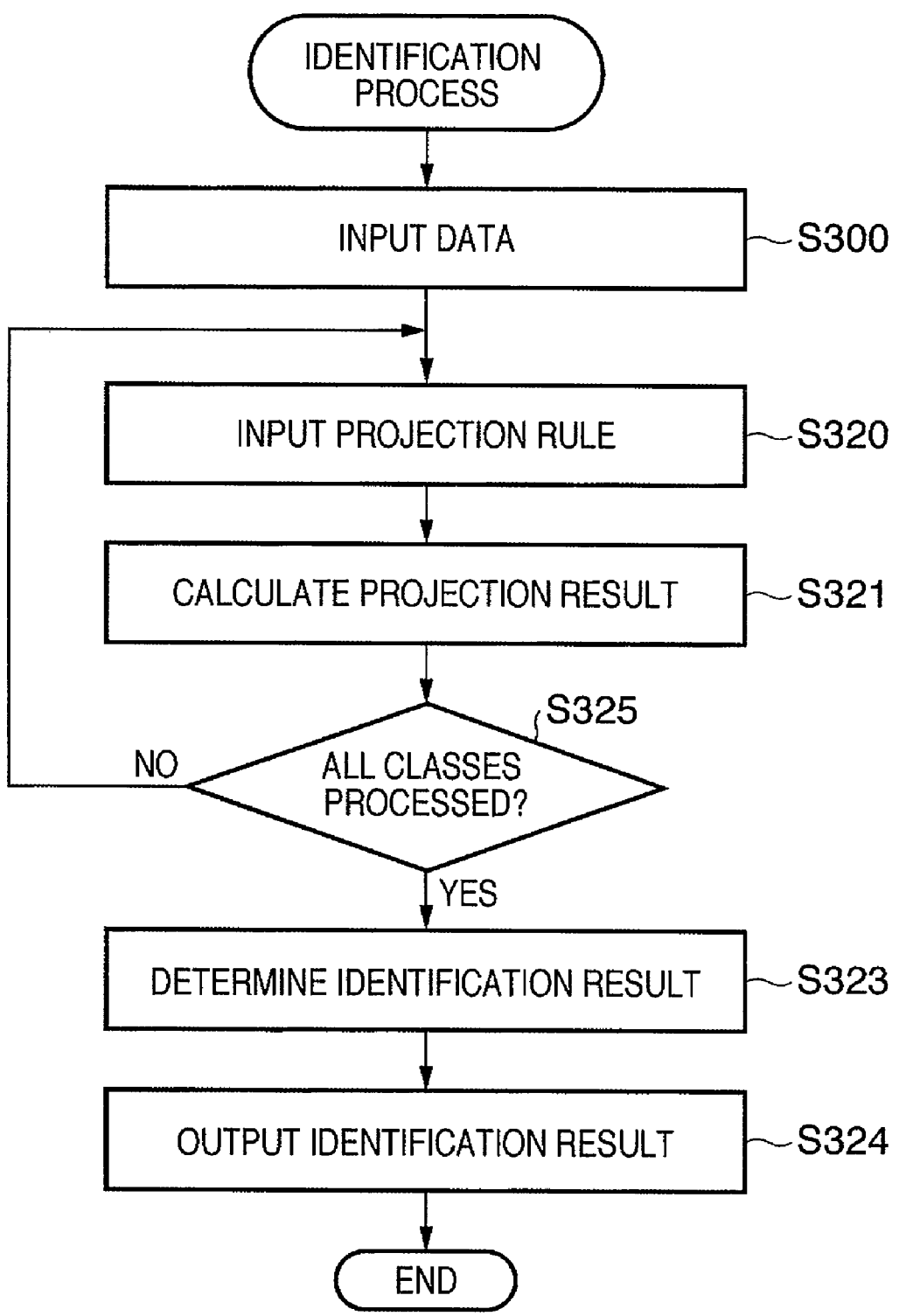
FIG. 3 is a flowchart illustrating the sequence of a process in an identification mode.

In this embodiment, the face images of a plurality of desired persons as registration targets are input, and a set of orthogonal normal bases corresponding to the respective persons are generated using a method to be described later as the projection rules of the persons to a low-dimensional expression space that approximates a manifold structure in advance by the process in the registration mode. In the process in the identification mode, the face image of a person whose identity is unknown is input and identified using the generated projection rules corresponding to the respective persons so as to determine whether the face image belongs to any one of the persons registered by the process in the registration mode or belongs to nobody. As shown in FIG. 1, a data input unit 100 and a projection rule holding unit 101 are common to both modes. FIG. 2 is a flowchart of the process in the registration mode. FIG. 3 is a flowchart of the process in the identification mode.

First, the process (registration process) in the registration mode of this embodiment will be described with reference to the registration mode process block 11 in FIG. 1 and the flowchart in FIG. 2. After that, the process (identification process) in the identification mode will be described with reference to the identification mode process block 12 in FIG. 1 and the flowchart in FIG. 3.

(Registration Process)

Referring to FIG. 1, the data input unit 100 is a processing unit for inputting the face image data of a person. As described above, input data is a gray-scale image including 20×20 pixels. Let x be a 400-dimensional vector in which the pixel values of the 20×20 pixels of the input data are arranged by raster scan.

The outline of the process by the registration mode process block will be described with reference to FIG. 2. FIG. 2 is a flowchart illustrating the sequence of the process in the registration mode. For example, the CPU 990 reads out a program from the RAM 992 and controls the pattern identification apparatus, thereby executing this process.

In step S200, data input is executed to input image data of registration targets. In step S200, the data input unit 100 inputs the face images of a plurality of desired registration target persons and holds the face images in a projection rule generation data holding unit 110. Letting m be the number of registration target persons (m≧1). The persons are given labels 1 to m, respectively. Let $N_c$ ($N_c$≧2) be the number of input face images of a person having label c (1≦c≦m). Let $x^c_i$ be a 400-dimensional vector that is the ith (1≦i≦$N_c$) input data of the face image of the person having label c. A set of the face images of the person having label c will be referred to as a class c hereinafter.

In the registration mode, next, a projection rule generation unit 111 generates the projection rule of each class using the input data held in the projection rule generation data holding unit 110 (step S210). A process of recording the projection rules in the projection rule holding unit 101 is performed (step S201). Each projection rule generated here is a projection rule to a regenerated space in the original feature space, which approximately saves a manifold structure for restricting the data of each class (expressing the entire data pattern of each class). This process will be described later in detail. In this embodiment, first, to approximately save the manifold structure of the data of each class, a low-dimensional hyperplane in a 400-dimensional space, which approximates a geodesic distance as a Euclidean distance, is obtained. An orthogonal normal basis that spans the hyperplane is obtained. A rule for projection using the orthogonal normal basis is a projection rule to be generated here. The projection rule holding unit 101 records the orthogonal normal basis obtained here. The process in step S210 will be described later in detail. When these processes are ended, the process in the registration mode finishes.

(Projection Rule Generation Process)

Figure 4:
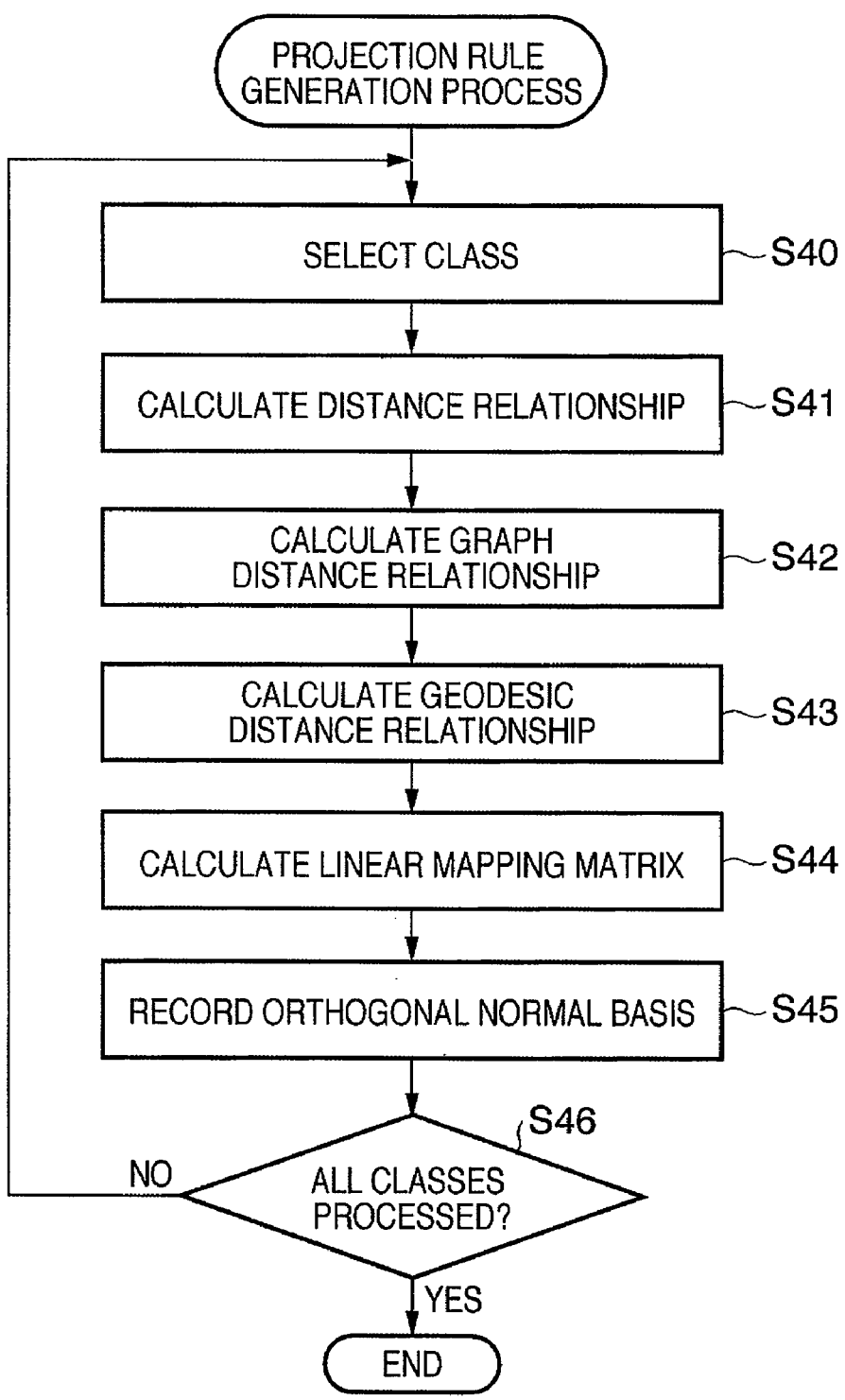
FIG. 4 is a flowchart illustrating the sequence of a projection rule generation process executed by a projection rule generation unit.

FIG. 4 is a flowchart illustrating a sequence of the projection rule generation process executed by the projection rule generation unit 111. The process of the projection rule generation unit 111 will be described below in detail with reference to FIG. 4. For example, the CPU 990 reads out a program from the RAM 992 and controls the pattern identification apparatus, thereby executing this process.

First, the projection rule generation unit 111 sequentially selects one of the registration target persons (classes) (class selection step S40). The order of selection can be arbitrary. In this embodiment, classes 1 to m are selected in order. Assume that the class c is selected. In the distance relationship calculation step S41, using, of the data input by the data input unit 100 and held in the projection rule generation data holding unit 110, all data of the class c, the projection rule generation unit 111 calculates the distance between data for all combinations of the data of the class c. More specifically, a Euclidean distance $d^c_x$ between ith data $x^c_i$ and jth data $x^c_j$ of the $N_c$ data of the class c is calculated for all combinations. When a combination of same data, that is to say, a case in which i=j (i.e., $d^c_x(i,j)$=0) is also taken into consideration, $(N_c)^2$ Euclidean distances $d^c_x(i,j)$ are obtained. For arbitrary i and j, $d^c_x(i,i)$=0, and $d^c_x(i,j)=d^c_x(j,i)$. For this reason, the number of distances to be actually calculated can be $N_c(N_c-1)/2$. In the process of the projection rule generation unit 111, after one class is selected in the class selection step S40, the data of the remaining classes are not used until the process returns to the class selection step S40 again to newly select another class. From now on, only the data of the class c will be used, and the subscript "c" in the number $N_c$ of data, data $x^c_i$, and distance $d^c_x(i,j)$ will be omitted, for descriptive convenience. That is, they will simply be expressed as N, $x_i$, and $d_x(i,j)$.

In this embodiment, a Euclidean distance is used in the distance relationship calculation step S41. However, the present invention is not limited to this. For example, any other indices including a Minkowski distance such as a Manhattan distance, and a Mahalanobis distance can be used as long as they satisfy the general axioms for a distance such as symmetry and nonnegative properties.

In the graph distance relationship calculation step S42, the projection rule generation unit 111 calculates a graph distance $d_G(i,j)$ between the ith data $x_i$ and the jth data $x_j$ of the N data of the class c for all combinations. A graph distance relationship matrix $D_G$ is obtained from the calculated graph distance $d_G(i,j)$. In this case, $d_G(i,j)$ is the graph distance between the ith data $x_i$ and the jth data $x_j$. The graph distance is defined in, for example, the following way.

When the two points represented by the ith data $x_i$ and jth data $x_j$ are in close vicinity (close to each other), $d_G(i,j)=d_x(i,j)$.

When the two points represented by the ith data $x_i$ and jth data $x_j$ are not in close vicinity (far apart from each other), $d_G(i,j)=\infty$.

In realistic calculation, ∞ cannot be used as a numerical value. Instead of ∞, a constant which is much larger than the maximum value of the Euclidean distance $d_x(i,j)$ for arbitrary i and j is used. The component of the ith row and jth column of the graph distance relationship matrix $D_G$ is $d_g(i,j)$. Since the number of data is N, the graph distance relationship matrix $D_G$ is an Nth-order square matrix. As for the graph distance $d_G(i,j)$ as a component, $d_G(i,j)=d_G(j,i)$. Hence, the graph distance relationship matrix $D_G$ is a symmetric matrix. Since $d_G(i,j)$=0, all diagonal components are 0.

In this embodiment, as for the vicinity between two points, k (k≧1) data except given data (k+1 data including the given data) are determined as data close to the given data in ascending order of distances from the given data, which are obtained in the distance relationship calculation step S41. If two points are not determined to be in close vicinity from either side, they are determined to be not in close vicinity. That is, in this embodiment, k data except given data are determined to be in close vicinity in ascending order of distances. However, for example, data points having a distance within a predetermined positive value ϵ may be defined as data in close vicinity. In this case, ϵ must have a large enough value that at least one of all the data points (except the given data point) is regarded as data in close vicinity. However, if ϵ is too large, even data points that should not be regarded as in close vicinity are also determined as data points in close vicinity. It is therefore preferable not to make the value s too large. Normally, ϵ has a value as to regard only several data points as data in close vicinity, although it also depends on the number of data points and the like.

In the geodesic distance relationship calculation step S43, a geodesic distance relationship matrix $D_M$ is obtained on the basis of the graph distance relationship matrix $D_G$ obtained in the graph distance relationship calculation step S42. In step S43, a geodesic distance $d_M(i,j)$ between two arbitrary data points of the N data points of the class c is calculated for all combinations by applying a Floyd-Warshall method to the graph distance relationship matrix $D_G$. The geodesic distance relationship matrix $D_M$ is obtained from the calculated geodesic distance $d_M(i,j)$.

In this case, $d_M(i,j)$ is the geodesic distance between the ith data $x_i$ and the jth data $x_j$. The geodesic distance is the shortest distance between arbitrary two points on a manifold which expresses the whole data set. The geodesic distance is obtained here approximately. The component of the ith row and jth column of the geodesic distance relationship matrix $D_M$ is $d_M(i,j)$. The geodesic distance relationship matrix $D_M$ is an Nth-order square symmetric matrix whose diagonal components are 0, like the graph distance relationship matrix $D_G$.

Using the Floyd-Warshall method, the geodesic distance $d_M(i,j)$ between two points represented by the ith data $x_i$ and the jth data $x_j$ is given by $$d_M(i,j) = \min\{d_G(i,j), d_G(i,k) + d_G(k,j)\}, k \neq i,j$$

Note that the geodesic distance may be calculated by any method other than the Floyd-Warshall method.

In the linear mapping matrix calculation step S44, a linear mapping matrix $A_c$ from the dimensions (400 dimensions in this embodiment) of the data input by the data input unit 100 to an h-dimensional (h<400; the actual value of h will be described later) space. The linear mapping matrix $A_c$ is a mapping matrix to a space which approximately saves a manifold structure expressing the entire data of the class c. The linear mapping matrix $A_c$ has the subscript "c" to clarify that the matrix is associated with c. However, the subscript "c" will be omitted for descriptive convenience.

In this embodiment, the linear mapping matrix A is a linear mapping from 400 dimensions to h dimensions and is therefore a 400×h matrix. Additionally, a constraint that h column vectors of the linear mapping matrix A correspond to h orthogonal normal bases including a 400-dimensional vector is satisfied. That is, a condition $A^T A = I$ is satisfied, where $A^T$ is the transpose of matrix A, and I is an h-dimensional unit matrix. A vector z obtained by linearly mapping the 400-dimensional vector x is given by $z = A^T x$, which is an h-dimensional vector. In the linear mapping matrix calculation step S44, the linear mapping matrix A which approximates, on a manifold in the space after mapping, the layout relationship of the data of the class c in the space before mapping is obtained, as described above. More specifically, the linear mapping matrix A is calculated such that the Euclidean distance between vectors $z_i$ and $z_j$ after mapping, which are obtained by mapping the arbitrary ith and jth data $x_i$ and $x_j$ of the class c using the linear mapping matrix A, approximates the geodesic distance $d_M(i,j)$ obtained before. However, $z_i = A^T x_i$, and $z_j = A^T x_j$. In this embodiment, the linear mapping matrix A is obtained as a minimization problem under the constraint $A^T A = I$ of an error function J(A) given by $$J(A) = \frac{1}{2} \cdot \frac{1}{\sum_{i<j} d_M(i,j)} \sum_{i<j} \frac{(|A^T x_i - A^T x_j| - d_M(i,j))^2}{d_M(i,j)} \quad (1)$$

Obtaining A that minimizes the error function A(J) under the constraint $A^T A = I$ is equivalent to searching for the minimum value of the error function A(J) on an algebraic manifold determined by the constraint $A^T A = I$ in the 400×h-dimensional space.

This embodiment assumes an example in which the linear mapping matrix A for minimizing the error function is obtained using a method disclosed in Japanese Patent Laid-Open No. 2003-30172. However, the present invention is not limited to this. For example, Lagrange's method of undetermined multiplier which is generally used in such optimization problems with a constraint is usable. Alternatively, the linear mapping matrix A may be obtained using, for example, the algorithm of Edelman et al., which is disclosed in Alan Edelman, Tomas Arias, and Steven T. Smith, "The Geometry of Algorithms with Orthogonality Constraints", Society for Industrial and Applied Mathematics Journal on Matrix Analysis and Applications, Vol. 20, pp. 303-353, 1998 (Edelman-Arias-Smith hereinafter).

It is possible to obtain the linear mapping matrix A as the minimization problem of the error function A(J) with a constraint using the above-described method. The number of columns of the linear mapping matrix A has been generalized as h above. However, the value h must be defined. Generally, the larger the value h is, the higher the approximation performance is, that is to say, the smaller the value of the error function A(J) can be. In this embodiment, however, h that is excessively large is not suitable from the viewpoint of identification performance improvement to be described later. In this embodiment, A is obtained using the above method while variously changing the value h. A linear mapping matrix A corresponding to the minimum value of h is selected from the obtained linear mapping matrices A that satisfy a predetermined condition. More specifically, first, the initial value of h is set to 1. Every time a linear mapping matrix A is obtained, the value h is incremented by one. It is verified whether A, obtained based on each value, satisfies a condition given by $$\forall_{i,j,k} d_M(i,j) \leq d_M(i,k) \rightarrow A^T(x_i - x_j) \leq A^T(x_i - x_k) \quad (2)$$

Expression (2) indicates a condition whether the distance relationship between three arbitrary points in the space after mapping satisfies at least the order of geodesic distance relationship. In this way, the linear mapping matrix A is obtained by the above method while incrementing h by one. When the linear mapping matrix A that satisfies the relationship (2) is obtained, the calculation is ended, and the obtained linear mapping matrix A is selected as the linear mapping matrix that should be obtained in the linear mapping matrix calculation step S44. In this embodiment, defining an error function given by Expression (1), the linear mapping matrix A that minimizes the error function is obtained as the minimum value searching problem on the algebraic manifold given by the constraint. However, the present invention is not limited to this. Any other method is also usable if it can obtain a linear mapping matrix satisfying the constraint while saving the geodesic distance relationship as much as possible. For example, the linear mapping matrix A may be obtained using another error function or the Lagrange's method of undetermined multiplier, as described above.

In the orthogonal normal basis recording step S45, the h column vectors of the linear mapping matrix A obtained in the linear mapping matrix calculation step S44 are recorded and held in the projection rule holding unit 101 in FIG. 1 as orthogonal normal bases related to the class c together with the label of the class c. The linear mapping matrix A satisfies the constraint $A^T A = I$, as described in association with the process in the linear mapping matrix calculation step S44. For this reason, the h column vectors of the linear mapping matrix A correspond to the orthogonal normal bases of the space mapped by the linear mapping matrix A. The linear mapping matrix A obtained in the linear mapping matrix calculation step S44 is a linear mapping to the space which approximates a manifold structure expressing the entire data of the class c. The orthogonal normal bases are used as the projection rules to the space which approximates a manifold structure expressing the entire data of the class c. When the number of columns of the linear mapping matrix A obtained in association with the class c is represented by $h_c$, there are $h_c$ orthogonal normal bases. These orthogonal normal bases are represented by $\{u^c_k\}$ (k=1, 2, ..., $h_c$) and recorded and held in the projection rule holding unit 101.

The process from the class selection step S40 to the orthogonal normal basis recording step S45 is repeated for all classes to be registered (whole class end determination branch S46). More specifically, when the process in step S45 is ended, it is determined in step S46 whether the process in steps S40 to S45 is ended for all classes. If the process is not yet ended (NO in step S46), the process returns to step S40 to execute the process in steps S40 to S45 for an unprocessed class. When the process is ended for all classes (YES in step S46), the process of the projection rule generation unit 111, that is to say, the process in the projection rule generation step S210 and the projection rule recording step S201 is ended. The process in the registration mode is thus ended. With the process in the registration mode, m sets of orthogonal normal bases of m persons of face image registration targets and class labels corresponding to them are saved in the projection rule holding unit 101 in FIG. 1.

(Pattern Identification Process)

The process in the identification mode according to this embodiment will be described with reference to the identification mode block 12 in FIG. 1 that shows the arrangement of the identification mode processing unit and the process sequence in FIG. 3. For example, the CPU 990 reads out a program from the RAM 992 and controls the pattern identification apparatus, thereby executing this process.

FIG. 3 is a flowchart illustrating the sequence of the process in the identification mode. First, in the data input step S300, the data input unit 100 inputs one gray-scale image data of an extracted human face including 20×20 pixels as an image identification target. A 400-dimensional vector in which the pixel values of the image are arranged by raster scan is generated, like the process in the registration mode. The obtained vector is defined as an input vector x.

In the projection rule input step S320, projection rules represented as orthogonal normal bases and registered in advance are read out from the storage device. More specifically, a projection rule input unit 120 selects a sets of orthogonal normal bases corresponding to one class from the m sets of orthogonal normal bases saved in the projection rule holding unit 101 by the process in the registration mode together with the label of the class corresponding to the set of orthogonal normal bases and inputs them. The order of selection can be arbitrary. In this embodiment, classes 1 to m registered by the process in the registration mode are selected in order. Assume that the class c is selected. That is, $h_c$ orthogonal normal bases $\{u^c_k\}$ (k=1, 2, ..., $h_c$) and corresponding label c are input here.

In the projection result calculation step S321, the projection length (or its square) of the input vector x to the space spanned by the orthogonal normal bases is obtained. More specifically, a projection result calculation unit 121 calculates the square $\{L_c(x)\}^2$ of the projection length of the input vector x input by the data input unit 100 to the space spanned by the $h_c$ orthogonal normal bases input by the projection rule input unit 120. The square $\{L_c(x)\}^2$ of the projection length can be calculated by $$\forall_{i,j,k} d_M(i,j) \leq d_M(i,k) \rightarrow A^T(x_i-x_j) \leq A^T(x_i-x_k) \tag{3}$$

In this embodiment, the square of the projection length is calculated for the sake of simplicity. However, the projection length that is the square root may be obtained. The projection length (square of the projection length) corresponds to the length of a projection vector to the hyperplane which approximates a manifold structure formed by the data set of the class c. The hyperplane is considered as a hyperplane which passes through an origin O and has, as a normal vector, the average normal direction (since the manifold is considered as a curved surface, the normal direction changes depending on the position on the manifold structure) of the manifold formed by the data set of the class c. That is, the manifold and the obtained hyperplane are supposed to have an almost parallel positional relationship. The data that is being used is face image data. For this reason, when data $x^c$ belonging to the arbitrary class c is multiplied by an arbitrary positive real number s, obtained data $sx^c$ also belongs to the class c. Consider a limit s→0. Since $sx^c$ gets closer and closer to 0, the manifold that expresses the entire data of the arbitrary class c is supposed to be a plane that passes through the origin O of the original feature space. As is apparent from the above two points, the obtained hyperplane almost matches the manifold serving as the basis. A value obtained by normalizing the projection length (square of the projection length) of the input data to each hyperplane in accordance with the magnitude of the input data can be used as an evaluation value representing the closeness of the input data to the hyperplane. Hence, the projection length to the hyperplane obtained here can be regarded as the similarity of the input vector x with respect to the class c. Normalization is not executed here on the basis of the magnitude of the input data. However, normalization based on the magnitude of the input vector is implicitly executed by magnitude comparison in the identification result determination step S323 to be described later. The square of the projection length obtained here is recorded in a projection result holding unit 122 together with the label of the class c.

The process in the projection rule input step S320 and the projection result calculation step S321 is repeated for all the m classes saved in the projection rule holding unit 101 (whole class end determination branch S325).

More specifically, when the process in step S321 is ended, it is determined in step S325 whether the process in steps S320 and S321 is ended for all classes. If the process is not yet ended (NO in step S325), the process returns to step S320 to execute the process in steps S320 and S321 for an unprocessed class. When the process is ended for all classes (YES in step S325), the process advances to the next identification result determination step S323 which is the process of an identification result determination unit 123.

With the above-described process, m squares $\{L_c(x)\}^2$ of the projection lengths corresponding to the m registered classes and the labels corresponding to the classes are recorded in the projection result holding unit 122.

Finally, in step S323, the identification result determination unit 123 and an identification result output unit 124 execute a process of obtaining, using the result recorded in the projection result holding unit 122, a determination result for the face image input by the data input unit 100. In step S324, the determination result is externally output. More specifically, the identification result determination unit 123 obtains a maximum one of the m squares $\{L_c(x)\}^2$ of the projection lengths corresponding to the registered classes, which are recorded in the projection result holding unit 122. The label of the class corresponding to the maximum square of the projection length is obtained as the determination result for the face image input by the data input unit 100. This process corresponds to the identification result determination step S323 in FIG. 3. Finally, the determination result is externally output (identification result output step S324), and the process in the identification mode is ended.

The above process enables the process in the identification mode, that is to say, the process of identifying a person to whom a face image belongs on the basis of the identification target gray-scale image data of an extracted human face including 20×20 pixels. This embodiment assumes that the input face image is the face of a person registered in the registration mode in advance. Hence, the identification result always indicates one of the persons registered in the registration mode. Assume that an image of an unregistered person is input. In this case, the face image is identified as an image of an unknown person when a value obtained by dividing the maximum value of the square $\{L_c(x)\}^2$ of the projection length by the square $|x|^2$ of the magnitude of the input vector is less than or equal to a predetermined value. The predetermined value used here can be obtained experimentally by, for example, inputting an image of an unregistered person and determining it as an image of an unknown person. The above-described registration and identification processes enable registration in advance of desired persons using a plurality of human face images each including 20×20 pixels, and when an unknown face image is input, identification of one of the registered persons to whom the face image belongs.

As described above, in the arrangement of this embodiment, to obtain a hyperplane which approximates a manifold structure expressing the entire data of each class, a projection rule which approximates the layout relationship and, more particularly, the geodesic distance relationship on the manifold is obtained. Then, the projection length of new input data of an identification target to a linear projection space defined by the projection rule, that is to say, a degenerated hyperplane in the original feature space is obtained. The projection length can be regarded as the similarity with respect to the data set distributed on the hyperplane. It is therefore possible to determine which class is similar to the input data by comparing the projection lengths to the hyperplane which are obtained in correspondence with the respective classes.

In this embodiment, an example has been described in which a gray-scale image of an extracted human face including 20×20 pixels is input, and the person to whom the face image belongs is identified. However, the target to which the arrangement of this embodiment is applicable is not limited to this. This will be described later in detail.

<<Second Embodiment>>

In this embodiment, as a modification of the arrangement for executing pattern identification according to the first embodiment, an example of an arrangement of pattern identification which extends a linear mapping of the first embodiment to a nonlinear mapping using a kernel function will be described.

In the first embodiment, a projection space which approximates a manifold structure expressing the entire data of each class is obtained. To do this, a low-dimensional linear mapping capable of saving the geodesic distance relationship between data as much as possible (especially in terms of the distance), that is to say, reducing the data size of a projection rule is considered. If the data distribution has a relatively simple shape (even in a nonlinear distribution), the above object can be achieved using a linear mapping. However, if the data distribution has a very complex shape, it is probably not possible to form a target mapping, that is to say a mapping to a space which satisfactorily approximates the data layout relationship on a manifold structure. In the second embodiment, an arrangement which replaces the linear mapping portion in the first embodiment with a nonlinear mapping using a kernel function will be described.

A kernel function is a real symmetric function which has $\chi \times \chi$ of a given set $\chi$ as a domain and satisfies a positive semidefinite characteristic. General examples of the kernel function are polynomial kernel $K(x,x')=(x,x'+1)^P$ and Gaussian kernel $K(x,x')=\exp(-|x-x'|^2/\sigma^2)$. In this embodiment, a projection rule is generated considering a nonlinear mapping using such a kernel function. That is, the second embodiment is different from the first embodiment only in that the projection rule to be used is not a linear projection rule but a nonlinear projection rule using a kernel function. In the second embodiment, only parts different from the first embodiment will be described in detail, and a description of the remaining parts will be omitted.

The functional arrangement and process sequence of the pattern identification apparatus according to the second embodiment are basically the same as those shown in FIGS. 1, 2, and 3 of the first embodiment. The differences between the second embodiment and the first embodiment will be described below in detail with reference to FIGS. 1 to 3. In the second embodiment, two modes, that is to say, a registration mode and an identification mode, exist, as in the first embodiment. First, a process in the registration mode of this embodiment will be described with reference to FIGS. 1 and 2. Then, a process in the identification mode will be described with reference to FIGS. 1 and 3.

In the registration mode of this embodiment, first, in step S200 in FIG. 2, a data input unit 100 inputs the face images of a plurality of desired registration target persons and holds the face images in a projection rule generation data holding unit 110. The notations of input data and classes of this embodiment are the same as in the first embodiment.

Subsequently, the process in the projection rule generation step S210 and the projection rule recording step S201 in FIG. 2 are executed. More specifically, a projection rule generation unit 111 generates the projection rule of each class using the input data held in the projection rule generation data holding unit 110 and records the projection rules in a projection rule holding unit 101. As described above, the outline of the process in the registration mode of this embodiment is basically the same as in the first embodiment. However, the projection rule generation process of the projection rule generation unit 111 is different.

(Projection Rule Generation Process)

Figure 5:
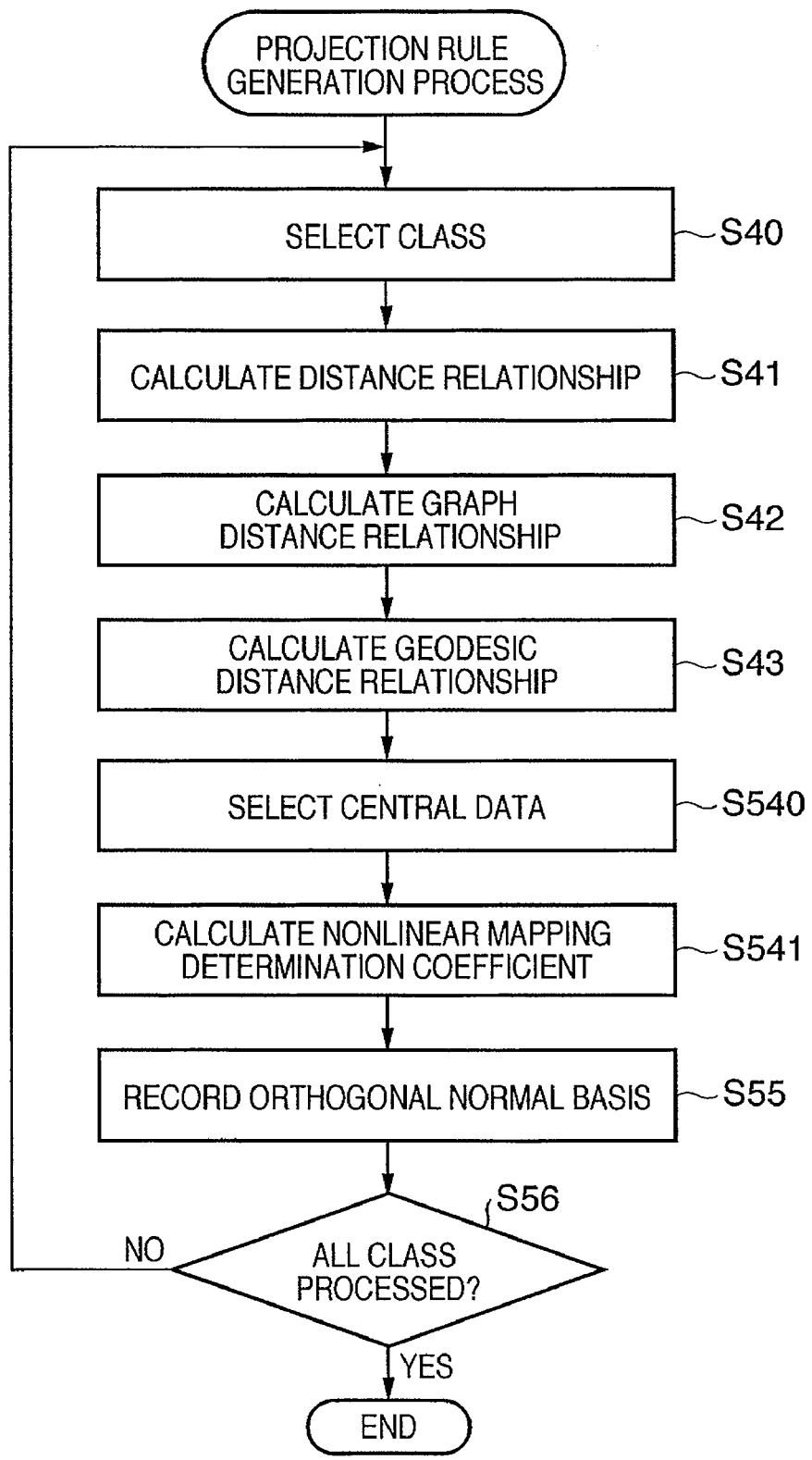
FIG. 5 is a flowchart illustrating the sequence of a projection rule generation process executed by a projection rule generation unit.

FIG. 5 is a flowchart illustrating the sequence of the projection rule generation process executed by the projection rule generation unit 111 of this embodiment. The process of the projection rule generation unit 111 according to this embodiment will be described below in detail with reference to FIG. 5. For example, a CPU 990 reads out a program from a RAM 992 and controls the pattern identification apparatus, thereby executing this process.

As shown in FIG. 5, the process of the projection rule generation unit 111 according to the second embodiment is also almost the same as that of the first embodiment shown in FIG. 4. More specifically, the linear mapping matrix calculation step S44 in FIG. 4 is replaced with the central data selection step S540 and nonlinear mapping determination coefficient calculation step S541. The contents of the succeeding process in the orthogonal normal basis recording step S55 change in accordance with the replacement. The changed contents of the process of the projection rule generation unit 111 according to this embodiment will be described below in detail.

In the pattern identification apparatus according to this embodiment, the projection rule generation unit 111 first executes the process from the class selection step S40 to the geodesic distance relationship calculation step S43 in FIG. 5. The process is the same as in steps S40 to S43 in FIG. 4 described in the first embodiment.

With the process in steps S40 to S43, a class c of a process target and a geodesic distance relationship matrix $D_M$ of the data of the class c are obtained, as in the first embodiment. The subscript "c" will be omitted, as in the first embodiment. In the second embodiment, when the process in step S43 has finished, the process advances to step S540 to select central data.

In the central data selection step S540, central data $x_M$ of the class c is obtained. The central data $x_M$ is a value that represents the data distribution of the class c and corresponds to, for example, the mean value or intermediate value of the data of the class c. The pattern identification apparatus of this embodiment selects data (central data $x_M$) which appears to be the center of the data distribution from the data of the class c in the following way. More specifically, the sum for each row (or each column because $D_M$ is a symmetric matrix) of the geodesic distance relationship matrix $D_M$ is calculated, and a row having a minimum sum is determined. If the Mth row has the minimum sum, the Mth data of the class c is selected as the probable central data $x_M$ which should be obtained here. The sample mean of the data of the class c may be used as the central data $x_M$. However, if the data distribution has a conspicuous nonlinearity, the sample mean does not generally exist on the manifold structure formed by the data of the class. Hence, in this embodiment, the central data of the class c is obtained by the above-described method. The obtained central data of the class c is used to obtain the similarity between the input data and the class c in the identification mode to be described later. This will be described later in detail in association with the process in the identification mode.

In the nonlinear mapping determination coefficient calculation step S541, the projection rule generation unit 111 obtains a kernel function value coupling weight vector group $\{\alpha_n\}$ which determines a nonlinear projection rule to a low-dimensional expression space while saving the geodesic distance relationship between data as much as possible (In this case, the hyperplane approximates the linear coupling relationship between data which belong to a corresponding class and are in close vicinity to each other). In the first embodiment, a linear mapping to the h-dimensional vector z, given by $z=A^T x$, is considered on the basis of the 400-dimensional vector x as the input data. In the second embodiment, h-dimensional vectors $\alpha_n$ (n=1, 2, ..., N) of N data of the selected class c, input vectors $x_n$ corresponding to the respective data, and the kernel function K(x,x') are used. A nonlinear mapping represented by $z=\Sigma \alpha_n \cdot K(x,x')$ ($\Sigma$ is the sum from n=1 to n=N) is considered. The N h-dimensional vectors $\alpha_n$ form the kernel function value coupling weight vector group to be obtained here (The subscript "c" should be added here to clarify that the vectors are associated with the class c. However, the subscript "c" is omitted for descriptive convenience). The mapping changes depend on the kernel function to be used (the function itself and the parameters p, σ, and the like of the above example of the kernel function). However, when they are fixed, the mapping is determined by only the N h-dimensional vectors $\alpha_n$. In this embodiment, a mapping to a low-dimensional expression space, which can save the geodesic distance relationship between data as much as possible, is formed by optimizing the N h-dimensional vectors $\alpha_n$ using the Gaussian kernel as the kernel function. The parameter σ of the Gaussian kernel can be an arbitrary constant. It is preferably a constant of the order of the Euclidean distance between input data in general. For a matrix Γ which has N rows and h columns and $\alpha_n^T$ as the row vector of the nth row, the optimization of the N h-dimensional vectors $\alpha_n$ is obtained as a solution of the minimization problem of an error function J(Γ) given by $$J(\Gamma) = \frac{1}{2} \cdot \frac{1}{\sum_{i<j} d_M(i,j)} \sum_{i<j} \frac{(|\Gamma^T \kappa_i - \Gamma^T \kappa_j| - d_M(i,j))^2}{d_M(i,j)} \quad (4)$$

under a constraint given by $$\forall k, l \sum_{i=1}^{N} \sum_{j=1}^{N} \alpha_{k,i} \alpha_{l,j} K(x_i, x_j) = \delta_{k,l} \quad (5)$$

where $\kappa_i$ in Expression (4) is an N-dimensional vector having $K(x_i,x_k)$ as the kth element. That is, $\kappa_i = \{K(x_i,x_1), K(x_i,x_2), ..., K(x_i,x_N)\}^T$. In Expression (5), $\alpha_{k,i}$ is the kth element of $\alpha_i$, and $\delta_{k,l}$ is Kronecker's δ. When k=l, $\delta_{k,l}=1$. When k≠l, $\delta_{k,l}=0$. In this embodiment as well, Γ for minimizing the error function under the constraint of Expression (5) is obtained using the method disclosed in Japanese Patent Laid-Open No. 2003-30172. The row vector of the nth row of the obtained matrix Γ is the h-dimensional vector $\alpha_n$ to be obtained.

The value h can be determined by selecting the minimum value of h with which the distance relationship after mapping satisfies at least the order of geodesic distance relationship.

Figure 11:
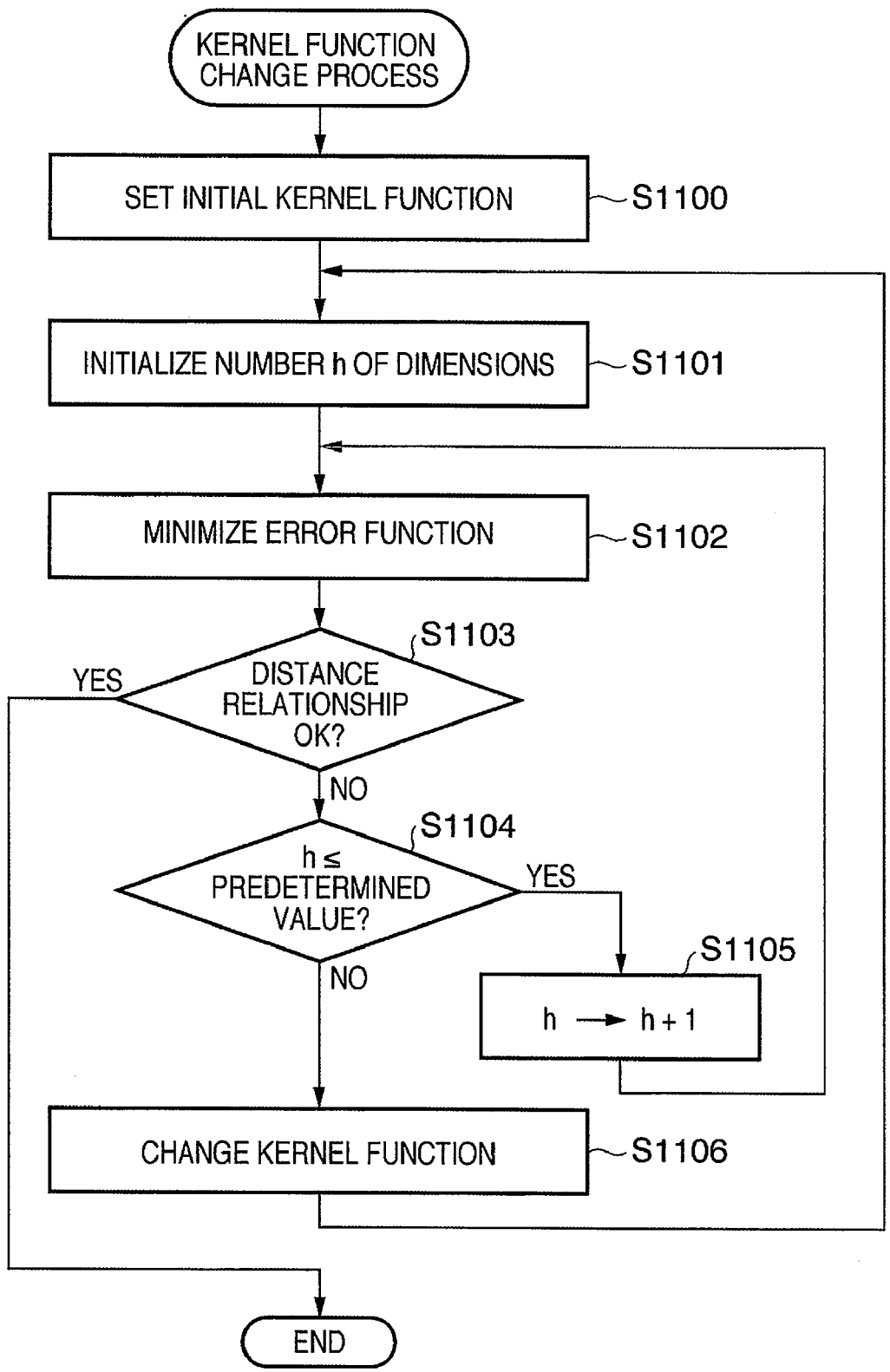
FIG. 11 is a flowchart illustrating the sequence of a process of obtaining a kernel function value coupling weight vector group while changing a kernel function.

Kernel Function Change Process Basically, the kernel function value coupling weight vector group is obtained by the above-described method. Depending on the type of the kernel function to be used and its parameter settings, it is difficult to satisfy the condition associated with the distance relationship before and after the mapping, which is represented by Expression (2), even when a large value h is used. In this case, the type of the kernel function or the parameters (the parameters p, σ, and the like of the above example of the kernel function) used in the kernel function are changed, and Γ for minimizing the error function is obtained again. A detailed example of the method of changing the kernel function will be described with reference to FIG. 11. FIG. 11 is a flowchart illustrating the sequence of a process of obtaining a kernel function value coupling weight vector group while changing the kernel function.

First, in the initial kernel function setting step S1100, a predetermined initial kernel function is set. For example, as the initial kernel function, Gaussian kernel $K(x,x')=\exp(-|x-x'|^2/\sigma^2)$ is set, and the parameter σ of the kernel function is set to 1.

In the number h of dimensions initialization step S1101, the number h of dimensions is initialized to 1.

In the error function minimization step S1102, the matrix Γ for minimizing the error function of Expression (4) is obtained under the constraint of Expression (5). As described above, since the total number of data is N, the matrix Γ has N rows×h columns. The rows of the matrix Γ obtained here correspond to the h-dimensional kernel function value coupling weight vector group $\{\alpha_n\}$ to be obtained. For example, the nth row of the matrix r is a kernel function value coupling weight vector $\alpha_n$ corresponding to the nth data. Since the number of data is N, n=1, 2, ..., N.

In the branch S1103 to determine whether the distance relationship satisfies a condition, the vector $z=\Sigma\alpha_n \cdot K(x,x')$ after mapping is obtained in correspondence with each of the N data by using the kernel function value coupling weight vector group $\{\alpha_n\}$ obtained in step S1102. Since $\alpha_n$ is an h-dimensional vector, the vector z after mapping is also an h-dimensional vector. Euclidean distances between the vectors after mapping are obtained for the N data. Since the distances are obtained for all combinations of two of the N data, $N\times(N-1)/2$ distances are obtained. The Euclidean distance between, for example, the vector of the ith data and that of the jth data after mapping obtained here is represented by $d_z(i,j)$. For all combinations $(N\times(N-1)\times(N-2)/6)$ of three selected from the N data, it is determined whether the selected three data satisfy the distance relationships before and after the mapping.

The process of determining whether data satisfy the distance relationships before and after mapping will be described using an example in which the ith, jth, and kth data are selected as three data points. Focus is placed on one (ith data) of the three data points. The geodesic distances from this data point to the two remaining data points are referred to. Since the geodesic distance is $d_M$ described in the first embodiment, the geodesic distances to the two remaining data points are $d_M(i,j)$ and $d_M(i,k)$. If the magnitude relationship between the two geodesic distances matches that between the precedingly obtained distances $d_z(i,j)$ and $d_z(i,k)$ between the vectors after mapping, it is determined that the data points satisfy the condition. Focus is similarly placed on the two remaining data points, and the condition of the magnitude relationship is determined. If the condition is satisfied for all of the three data points, it is determined that the distance relationships between the three data satisfy the condition.

The condition associated with the three data points is satisfied in all combinations of three data selected from the N data, it is determined that the distance relationships before and after mapping satisfy the condition (YES in step S1103), and the kernel function change process is ended. The kernel function and its parameters at this time are recorded. Then, a nonlinear mapping is obtained based on the h-dimensional kernel function value coupling weight vector group $\{\alpha_n\}$ using the kernel function and its parameters.

If at least one of the distance relationships cannot satisfy the condition in the above-described condition determination (NO in step S1103), the process advances to step S1104 to evaluate whether the number h of dimensions is less than or equal to a predetermined value. It is determined in step S1104 whether the number h of dimensions is less than or equal to a predetermined number of dimensions (e.g., 500 dimensions), and the process branches in accordance with the result. If the number h of dimensions is less than or equal to the predetermined number of dimensions (YES in step S1104), the process advances to the h incrementing step S1105 to increase the approximation accuracy of the distance relationships before and after mapping. After the number h of dimensions is incremented by one, the process returns to the error function minimization step S1102 to execute the same process again. If the number h of dimensions is not less than or equal to the predetermined number of dimensions (NO in step S1104), it is determined that the currently set kernel function and its parameters probably cannot implement a sufficient approximation accuracy of the distance relationships before and after mapping. Hence, the process advances to the kernel function change step S1106.

In the kernel function change step S1106, at least one of the currently set kernel function and its parameters is changed. In this case, one of the parameters of the kernel function is modified by adjusting it within a predetermined range at a predetermined granularity. Alternatively, the function shape of the kernel function itself is modified by selecting one of a plurality of kernel functions defined in advance. Assume that the currently set kernel function is the Gaussian kernel, and its parameter $\sigma$ is set in advance to change from 1 in its initial setting to 0.1 in steps of 0.05. In this case, if the parameter $\sigma$ of the Gaussian kernel is 1 in its initial setting, it is changed to 0.95. If the current parameter $\sigma$ is 0.85, it is changed to 0.8.

If the current parameter $\sigma$ is 0.1, the setting has already reached the limit of the predetermined range. In this case, the function shape of the kernel function itself is changed. Assume that the above-described polynomial kernel and a sigmoid kernel $K(x,x')=\tan h(a\cdot x^T x'-b)$ are defined in advance as a plurality of kernel functions, in addition to the currently used Gaussian kernel. The sigmoid kernel which does not satisfy the positive semidefinite characteristic can directly be used as a kernel function if it poses no particular problem in calculations.

The currently set Gaussian kernel is changed to one of the two functions. The kernel function after the change also has parameters (the polynomial kernel has a parameter p, and the sigmoid kernel has parameters a and b). Each parameter is set to an initial value. The initial value is set to the upper limit (or lower limit) of the range of the parameter used in the kernel function, which is determined in advance for each kernel function.

In this way, a parameter of the kernel function or the kernel function itself is changed in the kernel function change step S1106. In changing the parameter of a kernel function except the Gaussian kernel, the polynomial kernel has one parameter, like the Gaussian kernel, and therefore, the parameter is swung within a predetermined range in predetermined grain sizes. For a kernel function having a plurality of parameters, like the sigmoid kernel, each parameter is swung within a predetermined range in predetermined grain sizes, and all combinations of the parameters are tested.

After the process in the kernel function change step S1106 is ended, the process returns to the number h of dimensions initialization step S1101 to initialize the number h of dimensions to 1 again and execute the same process. The above-described process is repeated until all data satisfy the distance relationships before and after mapping in the above-described step S1103 where whether the distance relationships satisfy the condition is determined.

The above-described kernel function change process enables setting of a kernel function and its parameters, which can satisfy the distance relationships before and after mapping with a predetermined number of dimensions or less.

For example, if the upper limit of the number of dimensions is too small, or the range of a parameter of the kernel function is not appropriate, the data cannot satisfy the distance relationships before and after mapping. That is, even when all kernel functions and their parameters are tested, no solution that satisfies the distance relationships before and after mapping can be obtained, and the process cannot be completed. In such a case, the upper limit of the number of dimensions is raised, the range of the parameter of the kernel function is changed, or the number of kernel function candidates is increased. Then, the same process is executed again.

In the above-described method, the condition for ending the process is that all data satisfy the distance relationships before and after mapping. However, the end condition is not limited to this. For example, the process may be ended when 90% of all data satisfy the condition of the distance relationship. The condition of the distance relationship need not always be a condition that the data satisfy the magnitude relationship of the distances before and after mapping. For example, it may be a condition that the ratio of the distances before and after mapping falls within a predetermined range (e.g., 0.9 to 1.1).

Referring back to the nonlinear mapping determination coefficient calculation step S541 in FIG. 5, the process of the projection rule generation unit 111 in the registration mode of this embodiment will further be described. In this embodiment as well, an error function like Expression (4) is defined, and the matrix Γ for minimizing the error function under the constraint of Expression (5) is obtained using the method disclosed in Japanese Patent Laid-Open No. 2003-30172. However, the present invention is not limited to this, as in the first embodiment. Any other error function may be used, or the matrix Γ may be obtained using, for example, a Lagrange method of undetermined multiplier. Especially for the error function indicated by Expression (4), to obtain a more sparse solution, an L1 norm associated with F may be added as a regularization term to form an error function given by $$J(\Gamma) = \frac{1}{2} \cdot \frac{1}{\sum_{i<j} d_M(i,j)} \sum_{i<j} \frac{(|\Gamma^T \kappa_i - \Gamma^T \kappa_j| - d_M(i,j))^2}{d_M(i,j)} + \lambda \cdot \sum_k |\gamma_k|_{L1} \quad (6)$$

where $\gamma_k$ is the column vector of the matrix Γ, which is an N-dimensional vector, $|\gamma_k|$ is the L1 norm of $\gamma_k$, Σk of the second term is the sum from k=1 to k=h, and γ is a positive parameter which determines the regularization effect, that is to say, a constant which determines the regularization effect. A larger value γ enhances the regularization effect. The value to be actually used is determined experimentally in accordance with the target sparseness and final mapping performance. Even in this case, the matrix Γ can be obtained using the method disclosed in Japanese Patent Laid-Open No. 2003-30172 or the Lagrange's method of undetermined multiplier.

With the above-described process in the nonlinear mapping determination coefficient calculation step S541, N h-dimensional vectors $\alpha_n$ are obtained as the kernel function value coupling weight vector group which determines the nonlinear mapping of the class c. The geometrical meaning of the kernel function value coupling weight vector group will be described here.

The above-described kernel function (not only the Gaussian kernel) used in this embodiment can generally be expressed by $K(x,x') = \Phi(x)^T \Phi(x')$. In this expression, $\Phi(x)$ is a vector in a higher-order feature space, which is obtained by mapping the vector x to the higher-order feature space by nonlinear transformation.

That is, the value of a kernel function for the two vectors x and x' equals the inner product of $\Phi(x)$ and $\Phi(x')$ obtained by mapping the two vectors to the higher-order feature space. Generally, the higher-order feature space is a very high-dimensional (as compared to the dimensions of the original data) space. The higher-order feature space is an infinite-dimensional space for the Gaussian kernel used in this embodiment.

Nonlinear transformation $z = \Sigma \alpha_n \cdot K(x, x_n)$ of this embodiment, which is obtained based on the evaluation criterion for saving the manifold structure expressing the entire data as much as possible, will be examined here. On the basis of the kernel function characteristic $(K(x,x') = \Phi(x)^T \Phi(x') = \Phi(x')^T \Phi(x))$, the nonlinear transformation is represented by $$z = \Sigma \alpha_n \{\Phi(x_n)^T \Phi(X')\} = [\Sigma \alpha_n \Phi(x_n)^T] \Phi(x')$$

Let D be the number of dimensions of the higher-order feature space. Since an is the h-dimensional vector, $\Sigma \alpha_n \Phi(x_n)^T$ can be regarded as a matrix having h rows and D columns. Hence, the nonlinear transformation $z = \Sigma \alpha_n \cdot K(x,x_n)$ can be considered as a linear mapping to the degenerated h-dimensional space in the D-dimensional higher-order feature space. That is, the linear mapping is a mapping to a hyperplane in the higher-order feature space, which is spanned by the h row vectors of the matrix $\Sigma \alpha_n \Phi(x_n)^T$ and saves the manifold structure expressing the entire data as much as possible. The kth row vector of the matrix $\Sigma \alpha_n \Phi(x_n)^T$ which spans the hyperplane in the higher-order feature space is represented by a vector $\psi_k$. The kth element of $\alpha_n$ is represented by $\alpha_{k,n}$. At this time, $\psi_k = \Sigma \alpha_{k,n} \Phi(x_n)$. The constraint represented by Expression (5) in the process in the nonlinear mapping determination coefficient calculation step S541 will be considered. The constraint can be rewritten to $$\sum_{i=1}^{N} \sum_{j=1}^{N} \alpha_{k,i} \alpha_{l,j} K(x_i, x_j) = \sum_{i=1}^{N} \sum_{j=1}^{N} \alpha_{k,i} \alpha_{l,j} \Phi(x_i)^T \Phi(x_j) = \quad (7)$$

$$\left[\sum \alpha_{k,n} \Phi(x_n)\right]^T \sum \alpha_{l,n} \Phi(x_n) = \Psi_k^T \Psi_l = \delta_{k,l}$$

where Σ is the sum from n=1 to n=N, as defined above. Expression (7) indicates that the vector $\psi_k$ (k=1, 2, ..., h) which spans the hyperplane degenerated to the h dimensions in the higher-order feature space is the orthogonal normal basis of the hyperplane degenerated to the h dimensions. That is, the process of the projection rule generation unit 111 according to the second embodiment obtains an orthogonal normal basis which spans a hyperplane approximately saving a manifold structure, as in the first embodiment, although the first embodiment uses the original feature space, and the second embodiment uses the higher-order feature space.

As described above, with the process up to step S541, the central data $x_M$ of the class c, and the h orthogonal normal bases $\{\psi_k\}$ (k=1, 2, ..., h) which span the space degenerated to the h dimensions in the higher-order feature space are obtained.

Finally, in the orthogonal normal basis recording step S55, the label of the class, the central data of the class, and the h orthogonal normal bases are recorded. The label of the class and the central data $x_M$ of the class are recordable. However, the orthogonal normal bases are very high-dimensional vectors, and it is therefore difficult to actually record them in a recording medium having only a limited capacity. Especially, it is impossible to directly record infinite-dimensional vectors obtained by using a Gaussian kernel, as in this embodiment. However, in actually projecting data using the orthogonal normal bases by the process in the identification mode to be described later, only the inner product of the orthogonal normal basis and data mapped to the higher-order feature space is used. The inner product value can be expressed by a kernel function. That is, the orthogonal normal bases are never used directly.

In step S55, the data of the class c and the kernel function value coupling weight vector group $\alpha_n$ including the N h-dimensional vectors obtained in step S541 are recorded in place of the orthogonal normal bases defined in the actual higher-order feature space. The data of the class c recorded here is used in the process in the identification mode to be described later. In the description of the process in the identification mode, the central data of the class c is represented by $x^c_M$, and the number of data of the class c is represented by $N_c$. Of the $N_c$ $h_c$-dimensional kernel function value coupling weight vectors, the nth kernel function value coupling weight vector is represented by $\alpha^c_n$ (n=1, 2, . . . , $N_c$). Of the $N_c$ data, the ith data of the class c is represented by $x^c_i$ (i=1, 2, . . . , $N_c$).

In the second embodiment, the process from the class selection step S40 to the orthogonal normal basis recording step S55 is repeated for all classes to be registered, as in the first embodiment (whole class end determination branch S56). When the process for all classes is ended, the process of the projection rule generation unit 111 (i.e., the process in the projection rule generation step S210 and the projection rule recording step S201 in FIG. 2) is ended. The process in the registration mode is thus ended. With the process in the registration mode, the following data are saved in the projection rule holding unit 101 in FIG. 1.

M sets of data including a kernel function value coupling weight vector group corresponding to the orthogonal normal bases, in the higher-order feature space, of m persons of face image registration targets The central data of the class c The label corresponding to the class (Identification Process)

The process in the identification mode according to this embodiment will be described next with reference to an identification mode block 12 in FIG. 1 that shows the arrangement of the identification mode processing unit and the process sequence in FIG. 3.

In the identification mode of this embodiment, first, the process in the data input step S300 is executed, as in the first embodiment. More specifically, the data input unit 100 inputs one image data of an image identification target. Then, a 400-dimensional vector in which the pixel values of the image are arranged by raster scan is generated.

Next, the process in the projection rule input step S320 is executed. More specifically, a projection rule input unit 120 sequentially selects and inputs a set of data corresponding to one class from data such as the m sets of kernel function value coupling weight vectors saved in the projection rule holding unit 101 in the registration mode together with the label of the class corresponding to the set of data. The order of selection can be arbitrary, as in the first embodiment. Hence, classes 1 to m registered by the process in the registration mode are selected in order. As described above in the first embodiment, assume that the class c is selected. That is, the following data are input here.

The central data $x^c_M$ of the class c $N_c$ $h_c$-dimensional kernel function value coupling weight vectors $\alpha^c_n$ (n=1, 2, . . . , $N_c$)

$N_c$ data $x^c_i$ (i=1, 2, . . . , $N_c$) of the class c

The corresponding label c

The process in the projection result calculation step S321 is executed next. More specifically, a projection result calculation unit 121 obtains the square $\{R_c(x)\}^2$ of the projection length of the image $\Phi(x)$, in the higher-order feature space, of the input vector x input by the data input unit 100 to the hyperplane in the higher-order feature space. However, the data input by the projection rule input unit 120 determine the hyperplane in the higher-order feature space. The square $\{R_c(x)\}$ can be obtained using the same kernel function K as that used in the registration mode by $$\{R_c(x)\}^2 = K(x, x) - 2K(x, x^c_M) + K(x^c_M, x^c_M) - \sum_{k=1}^{h_c} \left\{ \sum_{n=1}^{N_c} \alpha^c_{k,n} K(x, x^c_n) - \sum_{n=1}^{N_c} \alpha^c_{k,n} K(x^c_M, x^c_n) \right\}^2 \quad (8)$$

where $\alpha^c_{k,n}$ is the kth element of the nth $h_c$-dimensional vector $\alpha^c_n$ in the kernel function value coupling weight vector group input by the projection rule input unit 120. The third term $K(x^c_M, x^c_M)$ (=1) and $$\sum_{n=1}^{N_c} \alpha^c_{k,n} K(x^c_M, x^c_n)$$

in the fourth term of Expression (8) do not depend on the input data x and may therefore be obtained in advance. In this embodiment, $K(x^c_M, x^c_M)$=1 because the Gaussian kernel is used as the kernel function.

In this embodiment, the square of the projection distance is calculated for the sake of simplicity. However, the projection distance that is the square root may be obtained. The projection distance (square of the projection distance) corresponds to the distance of the input data projected to the higher-order feature space to the hyperplane in the higher-order feature space, which approximates a manifold structure formed by the data set of the class c.

As described in the first embodiment, the hyperplane corresponding to each class in the higher-order feature space and the manifold expressing the entire data of each class in the higher-order feature space are supposed to have an almost parallel positional relationship. However, unlike the first embodiment, $s\Phi(x^c)$ obtained by multiplying an image $\Phi(x^c)$ of the input data $x^c$ belonging to the class c in the higher-order feature space by an arbitrary positive real s is not generally the data of the class c depending on the kernel function used. That is, generally, the manifold in the higher-order feature space is not always a plane passing through an origin O. For this reason, in this embodiment, when the projection length is used as the similarity of the class c, as in the first embodiment, it may be impossible to obtain sufficient performance. To prevent this, in this embodiment, a hyperplane determined by the input projection rule, which has an almost parallel positional relationship with respect to the manifold but passes through the origin O in the higher-order feature space, is translated so that the hyperplane almost matches the manifold in the higher-order feature space. In this embodiment, the translation is done such that the position of the origin O of the hyperplane matches the position of the image, in the higher-order feature space, of the central data of the class input in the projection rule input step S320. This translation makes the hyperplane almost match the manifold in the higher-order feature space. The distance between the moved hyperplane and the image $\Phi(x)$ of the input vector x in the higher-order feature space is obtained as the projection distance to be calculated here. Since the translated hyperplane almost matches the manifold in the higher-order feature space, the projection distance can be regarded as the similarity of the input vector x with respect to the class c. The square of the obtained projection distance is recorded in a projection result holding unit 122 together with the label c of the class.

In the first embodiment, the projection result calculation unit 121 obtains the projection length to each hyperplane as the similarity with respect to the class c. In the second embodiment, however, the projection result calculation unit 121 obtains the above-described projection distance to be used as the similarity with respect to each class. As described above, the pattern identification method of this embodiment is a so-called subspace method represented by Watanabe-Pakvasa. A generally used projection length method or projection distance method is also usable. In this embodiment, the image of the central data of a class in the higher-order feature space, which is obtained in advance, is used as the hyperplane translation amount. However, the present invention is not limited to this. For example, the sample mean in the higher-order feature space may be used.

The process in the projection rule input step S320 and the projection result calculation step S321 is repeated for all the m classes saved in the projection rule holding unit 101, as in the first embodiment (whole class end determination branch S325). As in the first embodiment, when the above process is ended for all classes, the process advances to the identification result determination step S323 which is the process of an identification result determination unit 123. With the above-described process, m squares $\{R_c(x)\}^2$ of the projection distances corresponding to the m registered classes, which are obtained in the projection result calculation step S321, and the labels corresponding to the classes are recorded in the projection result holding unit 122.

The process in the identification result determination step S323 is executed next. More specifically, as in the first embodiment, using the result recorded in the projection result holding unit 122, an identification result determination unit 123 and an identification result output unit 124 execute processing to obtain a determination result for the face image input by the data input unit 100.

More specifically, first, the identification result determination unit 123 obtains a minimum from among the m squares $\{R_c(x)\}^2$ of the projection distances corresponding to the registered classes, which are recorded in the projection result holding unit 122. The label of the class corresponding to the minimum square of the projection length is obtained as the determination result for the face image input by the data input unit 100.

Finally, in the identification result output step S324, the determination result is externally output, and the process in the identification mode is ended.

The above process enables the process in the identification mode, that is to say the process of identifying a person to whom a face image belongs on the basis of the identification target gray-scale image data of an extracted human face including 20×20 pixels. This embodiment also assumes that the input face image is the face of a person registered in the registration mode in advance. Hence, the identification result always indicates one of the persons registered in the registration mode. Assume that an image of an unregistered person is input. In this case, the face image is identified as an image of an unknown person when the minimum value of the square $\{R_c(x)\}^2$ of the projection distance obtained by the identification result determination unit 123 is greater than or equal to a predetermined value. The predetermined value used here can be obtained experimentally by inputting an image of an unregistered person and determining it as an image of an unknown person. The above-described processes in the registration and identification modes enable the registration in advance of desired persons using a plurality of human face images each including 20×20 pixels, and when an unknown face image is input, identification of one of the registered persons to whom the face image belongs.

As described above, in this embodiment, to obtain a hyperplane in a higher-order feature space, which approximates a manifold structure expressing the entire data set of each class, a projection rule which approximates the layout relationship and, more particularly, the geodesic distance relationship on the manifold is obtained. Then, the distance (projection distance) between a linear projection space in the higher-order feature space defined by the projection rule, (i.e., a degenerated hyperplane in the higher-order feature space and the image of new input data of an identification target in the higher-order feature space) is obtained. The distance to the hyperplane can be regarded as the similarity with respect to the data set distributed on the hyperplane. It is therefore possible to determine which class is similar to the input data by comparing the distances to the hyperplane which are obtained in correspondence with the respective classes. The arrangement of this embodiment approximates a manifold using whole data, unlike, for example, Laaksonen's method of obtaining the tangent plane of a manifold using only local data. This has a tendency to reduce the influence of, for example, data density and stabilize performance.

The above-described method can replace the linear mapping of the first embodiment with a nonlinear mapping using a kernel function and therefore cope with a more complex pattern distribution. In the embodiment, the kernel function is fixed. However, the present invention is not limited to this. For example, after projection rules are generated using other various kernel functions (including the function itself and the parameters p, σ, and the like of the above example of the kernel function), performance test is executed, and a kernel function capable of obtaining the highest performance is selected. The performance test is done using a number of data other than those used in the registration mode, and the number of identification errors for the data is used to measure the performance.

<<Third Embodiment>>

(Outline)

In this embodiment, an arrangement example will be described, which generates the same projection rules as in the second embodiment using a data set labeled normal and detects using the projection rules whether a newly input pattern (process target data) is normal or abnormal.

A so-called subspace method described in, for example, Watanabe-Pakvasa is known as effective for abnormal pattern detection. In abnormal pattern detection using the subspace method, first, the subspace of a normal pattern is obtained by PCA using a plurality of normal patterns. A new input pattern is projected to the subspace obtained by PCA. If the projection length is less than or equal to a predetermined value, or the projection distance is greater than or equal to a predetermined value, the input pattern is detected as an abnormal pattern.

The methods described in the first and second embodiments are also applicable to such abnormal pattern detection, like the subspace method. In the third embodiment, an example of an arrangement for detecting, as an abnormal pattern, surface defects from an image obtained by photographing a surface of a product having a complex texture pattern will be described as an example of abnormal pattern detection. In this embodiment, a rubber plate having a roughened surface will be exemplified as a product having a complex texture pattern. However, the present invention is not limited to this and is also applicable to detection of surface defects of any other product.

FIGS. 6A to 6J are views showing examples of process target patterns of this embodiment. Each of the drawings illustrates an area having 128×128 pixels and extracted from a gray-scale image obtained by photographing the surface of a rubber plate which has undergone surface roughening.

FIGS. 6A to 6E are views showing areas extracted from an image of a normal rubber plate. FIGS. 6F to 6J are views showing areas including defective portions (indicated by circles in FIGS. 6F to 6J) extracted from an image of a rubber plate including defects.

In this embodiment, the image patterns shown in FIGS. 6A to 6E are defined as normal patterns. The image patterns shown in FIGS. 6F to 6J are defined as abnormal patterns. FIGS. 6F and 6G show examples of patterns including defects like black spot-shaped unevenness. As shown in FIGS. 6F and 6G, the defects exhibit various shapes and sizes. There are various kinds of defects, including a pattern having an allover gradation as shown in FIG. 6H, a pattern having white spot-shaped unevenness as shown in FIG. 6I, and a pattern whose texture contrast is partially low as shown in FIG. 6J.

In detecting defects from a high-contrast complex texture pattern as in this embodiment, it is difficult to accurately detect the defects using a threshold process of a luminance value or edge extraction value often used in conventional surface defect detection. If defects to be detected are only of a limited type, they can be detected by executing a process corresponding to the defect type. However, if there are various defect types, and the kinds of defects that should appear in the future are unknown, it is also difficult to apply a method to cope with each defect type. In this embodiment, a normal pattern is modeled in some form using a plurality of normal patterns. An input pattern is compared with the normal pattern model, thereby detecting an abnormal pattern.

The abnormal pattern detection using the subspace method according to the embodiment obtains a linear subspace capable of satisfactorily expressing a normal pattern by PCA using a plurality of normal patterns and uses the linear subspace as a normal pattern model. The degree of separation from the linear subspace serving as the normal pattern model is evaluated using the projection length or projection distance of an input pattern projected to the linear subspace. An abnormal pattern is detected based on the degree of separation.

The abnormal pattern detection according to the embodiment generates a normal pattern model from a plurality of normal patterns and evaluates the degree of separation from the model, thereby detecting an abnormal pattern, like the subspace method. More specifically, a linear projection space in a higher-order feature space, which satisfactorily approximates the data layout relationship on a manifold expressing an entire normal pattern, is obtained by the same method using a kernel function as in the second embodiment. An input pattern is projected to the obtained linear projection space in the higher-order feature space. Whether the input pattern is a normal pattern or abnormal pattern is determined on the basis of the projection distance, thereby detecting an abnormal pattern.

That is, in the second class, a plurality of classes are registered. In the third embodiment, however, only one class is registered, and the class indicates only normal patterns. Whether new input data belongs to the class (i.e., normal pattern class) is determined, thereby detecting an abnormal pattern. As described above, the third embodiment is similar to the second embodiment except only that the input data is different, and only one class is registered. Hence, in the third embodiment, only parts different from the second embodiment will be described in detail, and a description of the same parts as in the second embodiment will be omitted.

(Functional Arrangement)

The functional arrangement of an abnormal pattern detection apparatus according to this embodiment will be described next with reference to FIG. 7. FIG. 7 is a block diagram showing the functional arrangement of the abnormal pattern detection apparatus according to this embodiment.

In the arrangement of the third embodiment, the modes are roughly classified into two modes, as in the first and second embodiments. One of the modes is a normal pattern modeling mode 71 for generating a normal pattern model, and the other is an abnormal pattern detection mode 72 for detecting whether a new input pattern is an abnormal pattern.

The outline of the processes in the two modes will be described. In the normal pattern modeling mode 71, a normal pattern is modeled using a plurality of normal patterns. More specifically, a linear projection space in a higher-order feature space, which approximates the layout relationship on a manifold expressing the whole of the plurality of normal patterns, is obtained and generated as a normal pattern model in the same way as described in the second embodiment.

In the abnormal pattern detection mode 72, using the model generated in the normal pattern modeling mode 71, the degree of separation between the model and a new input pattern is obtained. It is detected on the basis of the degree of separation whether the new input pattern is an abnormal pattern. More specifically, the new input pattern is projected to a linear projection space in a higher-order feature space generated as the normal pattern model. The projection distance is regarded as the degree of separation. If the degree of separation has a predetermined value or more, the pattern is detected as an abnormal pattern.

(Process in Normal Pattern Modeling Mode)

Figure 8:
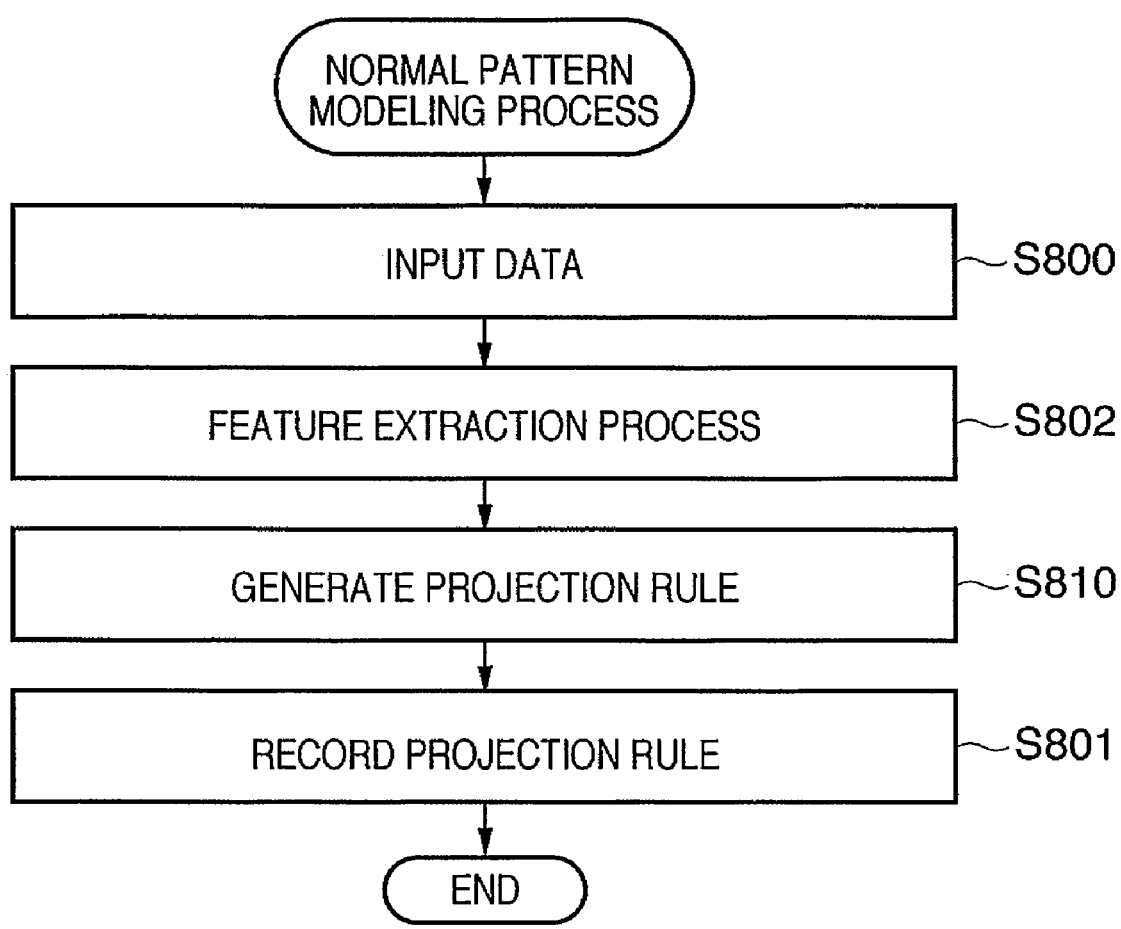
FIG. 8 is a flowchart illustrating the sequence of a process in a normal pattern modeling mode.

As the processes of the processing units shown in FIG. 7, the process in the normal pattern modeling mode 71 will be described first in detail with reference to FIG. 7 and FIG. 8 that illustrate the process sequence in the normal pattern modeling mode 71. Next, the process in the abnormal pattern detection mode 72 will be described in detail with reference to FIG. 7 and FIG. 9 that illustrate the process sequence in the abnormal pattern detection mode 72.

In the normal pattern modeling mode of this embodiment, first, a data input unit 700 inputs a plurality of normal image data (step S800). The normal image data input here is an image obtained by photographing the surface of a rubber plate (to be referred to as a normal sample hereinafter) subjected to surface roughening and determined as normal in advance. In this embodiment, the normal image data is a gray-scale image including 1024×768 pixels. Assume that N normal image data items obtained by photographing N normal samples are input.

The process of a feature extraction processing unit 702 (step S802) in the normal pattern modeling mode of this embodiment will be described next. The feature extraction processing unit 702 extracts a normal pattern from each of the N normal image data items input by the data input unit 700 and hierarchically executes discrete wavelet transformation for each pattern. The feature extraction processing unit 702 generates wavelet feature vectors corresponding to the respective patterns on the basis of the pattern conversion results and records and holds them in a projection rule generation data holding unit 710. Each process will be described below in detail.

In this embodiment, an area including 128×128 pixels is extracted from an arbitrary position of normal image data and used as a normal pattern. The number of areas to be extracted and their positions are arbitrary. However, a manifold structure expressing the entire normal pattern can accurately be approximated at a high probability by using a lot of patterns. Hence, in this embodiment, all possible 128×128 pixel patterns are extracted from normal image data. Since the normal image data has 1024×768 pixels, the number of possible 128×128 pixel patterns is (1024−128+1)×(768−128+1)=574977. Since these patterns are extracted from each of N normal image data items, the total number of patterns is 574977×N.

The feature extraction processing unit 702 hierarchically executes discrete wavelet transformation for each of the extracted patterns. In this embodiment, discrete wavelet transformation uses a Haar basis. In the discrete wavelet transformation, a two-dimensional pattern such as an image is transformed into four patterns: high-frequency component extraction patterns in the vertical, horizontal, and vertical/horizontal directions and a low-frequency component pattern, all of which have a resolution ½ that before transformation. In this embodiment, a 128×128 pixel pattern is transformed into four patterns each including 64×64 pixels by the first discrete wavelet transformation.

The transformed vertical high-frequency component extraction pattern HL1, the horizontal high-frequency component extraction pattern is LH1, the vertical and horizontal high-frequency component extraction pattern is HH1, and the low-frequency component pattern is LL1. HL, LH, and HH indicate vertical, horizontal, and vertical and horizontal high-frequency component extraction patterns, respectively. LL indicates a low-frequency component pattern. For example, "1" of HL1 indicates that this is a result of the first discrete wavelet transformation.

In this embodiment, the low-frequency component pattern LL1 is further subjected to discrete wavelet transformation and transformed into four patterns each including 32×32 pixels. The transformed vertical high-frequency component extraction pattern HL2, the horizontal high-frequency component extraction pattern is LH2, the vertical and horizontal high-frequency component extraction pattern is HH2, and the low-frequency component pattern is LL2. The low-frequency component pattern LL2 is further subjected to discrete wavelet transformation. In this way, the discrete wavelet transformation is executed hierarchically. The discrete wavelet transformation is repeated until vertical (HL2), horizontal (LH2), and vertical and horizontal (HH2) high-frequency component extraction patterns and a low-frequency component pattern (LL2) each including 1×1 pixel are finally obtained. The pattern before transformation has 128×128 pixels. Patterns each including 64×64 pixels are obtained by the first transformation. Patterns each including 32×32 pixels are obtained by the second transformation. Then, the number of pixels included in one pattern decreases to 16×16 pixels, 8×8 pixels, 4×4 pixels, and 2×2 pixels. Patterns each including 1×1 pixel are obtained by the last seventh transformation. More specifically, the finally obtained four 1×1 pixel patterns are HL7, LH7, HH7, and LL7.

A wavelet feature vector is generated from each of the patterns obtained by such hierarchical discrete wavelet transformation. In this case, a vector in which the element values of the high-frequency component extraction patterns in the respective directions and the finally extracted low-frequency component pattern LL7 are arranged in order as elements is generated. The element values can be arranged in an arbitrary manner if it is common to all patterns. In this embodiment, the numeral values are arranged by raster scan sequentially from the patterns obtained by the first discrete wavelet transformation in an order of vertical, horizontal, and vertical/horizontal directions. More specifically, the first 64×64=4096 elements are obtained by arranging the pixel values of the vertical high-frequency component extraction pattern HL1 obtained by the first discrete wavelet transformation sequentially from the upper left corner by raster scan. The 4096 elements including the 4097th to 8192nd elements are obtained by arranging the pixel values of the horizontal high-frequency component extraction pattern LH1 obtained by the first discrete wavelet transformation sequentially from the upper left corner by raster scan.

The 4096 elements including the 8193rd to 12288th elements are obtained by arranging the pixel values of the vertical and horizontal high-frequency component extraction pattern HH1 obtained by the first discrete wavelet transformation sequentially from the upper left corner by raster scan. The process advances to the result of the second discrete wavelet transformation. This time, the 32×32=1024 elements including the 12289th to 13312th elements are obtained by arranging the pixel values of the vertical high-frequency component extraction pattern HL2 obtained by the second discrete wavelet transformation sequentially from the upper left corner by raster scan. In this way, the numerical values are arranged sequentially up to the vertical and horizontal high-frequency component extraction pattern HH7 obtained by the seventh discrete wavelet transformation. The last element is the value of the low-frequency component pattern LL7 obtained by the seventh discrete wavelet transformation. With this process, a $\{(64 \times 64)+(32 \times 32)+(16 \times 16)+(8 \times 8)+(4 \times 4)+(2 \times 2)+(1 \times 1)\} \times 3+(1 \times 1)=16384$-dimensional vector is obtained. This vector is obtained as a wavelet feature vector corresponding to each pattern and recorded and held in the projection rule generation data holding unit 710.

With the above process, the projection rule generation data holding unit 710 records 16384-dimensional wavelet feature vectors equal in number to the extracted patterns, that is to say, 574977×N 16384-dimensional wavelet feature vectors. The process of the feature extraction processing unit 702 in the normal pattern modeling mode of this embodiment is thus ended. The above process corresponds to the feature extraction process step S802 in FIG. 8.

As described above, in this embodiment, discrete wavelet transformation is executed for each pattern extracted from the normal image data. Wavelet feature vectors are generated from the patterns and recorded and held in the projection rule generation data holding unit 710. However, the projection rule generation data is not limited to this. For example, a vector may be obtained by arranging the pixel values of an extracted pattern itself by raster scan and recorded in the projection rule generation data holding unit 710. However, in a very random pattern to be described in this embodiment, it is probably impossible to appropriately execute the succeeding process using the vector obtained by directly arranging the pixel values. Hence, it is preferable to extract a certain feature, as in this embodiment.

Figure 10:
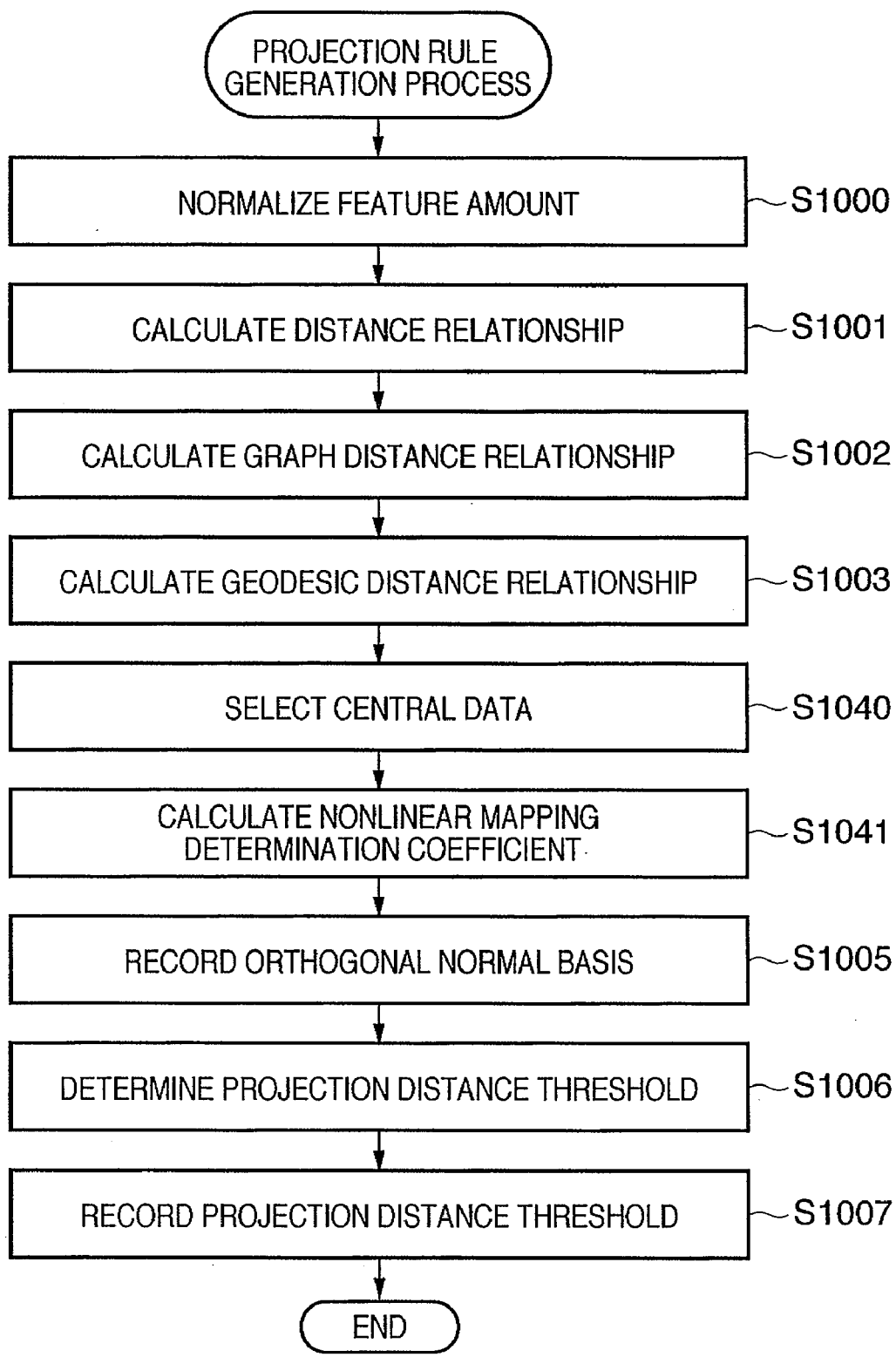
FIG. 10 is a flowchart illustrating the sequence of a process by a projection rule generation unit.

After the end of the process of the feature extraction processing unit 702 in the normal pattern modeling mode 71 of this embodiment, the process of a projection rule generation unit 711 starts (step S810). FIG. 10 is a flowchart illustrating the sequence of the process by the projection rule generation unit 711.

As shown in FIG. 10, the process of the projection rule generation unit 711 is similar to that of the projection rule generation unit 111 according to the second embodiment shown in FIG. 5. The projection rule generation unit 711 of this embodiment generates a projection rule in a higher-order feature space by the same process as in the projection rule generation unit 111 of the second embodiment using the wavelet feature vector held in the projection rule generation data holding unit 710. The projection rule is recorded in a projection rule holding unit 701.

In the second embodiment, a plurality of classes are present, and a projection rule in a higher-order feature space is generated for each class. In the third embodiment, only one class of normal patterns exists, and a projection rule corresponding to it is generated. In the identification mode 12 of the second embodiment, an input pattern is projected in accordance with the projection rule generated in correspondence with each class, and the projection distances are compared to determine the class to which the input pattern belongs. In the third embodiment, however, only one class is used, and it cannot be compared with the result of another class. Hence, a projection rule corresponding to the class of the normal pattern is generated, and simultaneously, a threshold of the projection distance is also determined. The projection rule holding unit 701 records and holds the threshold, too.

The process of the projection rule generation unit 711 will be described below in detail with reference to FIG. 10. As described above, the process of the projection rule generation unit 711 of this embodiment is similar to that of the projection rule generation unit 111 of the second embodiment. Hence, a description of the same parts as in the second embodiment will be omitted.

The process in the feature amount normalization step S1000 in FIG. 10 will be described next. The element values of the wavelet feature vectors, which are generated by the projection rule generation unit 711 and held in the projection rule generation data holding unit 710 by the process up to the feature extraction process (step S802) in the normal pattern modeling mode 71 of this embodiment, are normalized.

In this embodiment, the projection rule generation data holding unit 710 holds 574977×N 16384-dimensional wavelet feature vectors, as described above. All the vectors are normalized here. The normalization process is not always necessary. In this embodiment, a kernel method using a Gaussian kernel is applied to implement a nonlinear mapping, as in the second embodiment. In this case, generally, the element values of a vector preferably have almost the same ranges. Hence, in this embodiment, normalization is performed by dividing each element value of a vector by the standard deviation of a corresponding element value.

The standard deviation to be used for the normalization can be obtained for each element value of the 574977×N wavelet feature vectors. However, 64×64 elements of a wavelet feature vector, including the first to 4096th elements, are supposed to have almost the same values. That is, the element values corresponding to a portion where the pixel values of the vertical high-frequency component extraction pattern HL1 obtained by the first discrete wavelet transformation are arranged are supposed to have almost the same values. In this embodiment, the standard deviation of each of such portions is obtained, and normalization is executed using it.

More specifically, for, for example, the first to 4096th elements, the standard deviation of the first to 4096th elements of each of the total of 574977×N wavelet feature vectors, that is to say, the standard deviation of 574977×N×4096 element values is obtained. The first to 4096th elements of each wavelet feature vector are divided by the standard deviation, thereby performing normalization. Next, for the 4097th to 8192nd elements, the standard deviation of the 4097th to 8192nd element values of all wavelet feature vectors is obtained. The 4097th to 8192nd elements of each wavelet feature vector are divided by the standard deviation. In a similar manner, normalization is sequentially executed for the 8193rd to 12288th elements, for the 12289th to 13312th elements (from here, 32×32=1024 elements), . . . . When the last 16384th element, that is to say, the low-frequency component pattern LL7 obtained by the seventh discrete wavelet transformation is divided by the standard deviation (obtained based on 574977×N×1 element values), the normalization is ended.

The standard deviations obtained for normalization are used for the process in the abnormal pattern detection mode 72 to be described later and therefore recorded in the projection rule holding unit 701. The above-described process corresponds to the feature amount normalization step S1000 in FIG. 10.

The process in the distance relationship calculation step S1001 to the orthogonal normal basis recording step S1005 shown in FIG. 10 is executed for the normalized wavelet feature vectors. This process is the same as that in the distance relationship calculation step S51 to the orthogonal normal basis recording step S55 in FIG. 5 described in the second embodiment. For this process, the description of the second embodiment will be referred, and a detailed description will be omitted.

In the second embodiment, a pattern has 20×20 pixels=400 dimensions. In the third embodiment, a pattern has 16,384 dimensions, and the same process as described above can be executed. In the second embodiment, the process here is executed independently for each of a plurality of classes. In the third embodiment, the process is executed for only one class of normal patterns.

That is, in this case, a linear projection space in a higher-order feature space, which saves the layout relationship on a manifold expressing the entire normal pattern as much as possible, is obtained by minimizing an error function of Expression (4) or (6) described in the second embodiment. More specifically, a linear projection space in a higher-order feature space, which saves the geodesic distance relationship between the normal patterns in the original feature space of the wavelet feature vectors as much as possible, is obtained.

With the process in the distance relationship calculation step S1001 to the orthogonal normal basis recording step S1005, the following data are obtained as in the second embodiment.

574977×N kernel function value coupling weight vectors $\alpha_n$

Central data $x_M$ of one class of the normal pattern

The kernel function value coupling weight vector is the coupling weight vector of the kernel function value corresponding to each pattern, which serves as a parameter for determining the nonlinear mapping $z=\Sigma \alpha_n \cdot K(x, x_n)$ of the input vector x, as described in the second embodiment. In this case, $\Sigma$ is the sum from n=1 to n=574977×N.

As described above, one kernel function value coupling weight vector exists in correspondence with each pattern. In the second embodiment, since the number of patterns of one class is N, N kernel function value coupling weight vectors are obtained. In the third embodiment, since the number of patterns is 574977×N, 574977×N kernel function value coupling weight vectors are obtained.

The number of dimensions of the kernel function value coupling weight vector is determined in the same way as in the second embodiment. More specifically, a minimum number of dimensions with which the distance relationship of the normal pattern after mapping satisfies at least the order of geodesic distance relationship. Even in this case, if selection of the kernel function or the parameters of the kernel function are inappropriate, it may be impossible to satisfy the distance relationship before and after mapping even when h is a large value. In such a case, the kernel function is reselected, or the parameters of the kernel function are changed by the same method as described in the second embodiment. As the central data $x_M$, one of the normalized 574977×N wavelet feature vectors is selected by the same process as in the central data selection step S540 of the second embodiment. As in the second embodiment, the following data obtained by the above process are recorded in the projection rule holding unit 701.

574977×N kernel function value coupling weight vector group $\alpha_n$

Central data $x_M$

Normalized 574977×N wavelet feature vectors obtained in the feature amount normalization step S1000

The above-described process corresponds to the process in steps S1001 to S1005.

In the projection distance threshold determination step S1006, a threshold is determined, which defines the range of the projection distance of each pattern projected to the linear projection space in the higher-order feature space obtained by the process up to step S1005 and is used to regard a pattern as a normal pattern. In this case, the 574977×N wavelet feature vectors normalized in the feature amount normalization step S1000 are actually projected to the linear projection space in the higher-order feature space obtained by the process up to step S1005, and on the basis of their distances, the threshold is determined. The projection distance (in fact, the square of the projection distance) of each pattern is obtained by Expression (8) of the second embodiment using the kernel function value coupling weight vector group $\alpha_n$, central data $x_M$, and the like obtained in advance. Expression (8) includes a subscript "c" indicating the class label. In the third embodiment, since only one class of normal patterns is used, the subscript is neglected in calculation.

In this embodiment, a maximum one of the 574977×N projection distances obtained using Expression (8) is obtained and determined as the threshold. That is, in this embodiment, the maximum one of the projection distances of the actually projected normal patterns is used as the threshold. However, the arrangement of the embodiment is not limited to this. For example, a range in which the distances of a predetermined ratio (e.g., 95%) of normal patterns fall may be used as the threshold.

Instead of using only normal patterns, the threshold may be determined using patterns known to be abnormal, as shown in FIGS. 6F to 6J. In this case, discrete wavelet transformation is executed for the abnormal patterns to generate wavelet feature vectors, like the above-described process of the normal patterns. Next, a normalization process equivalent to the feature amount normalization executed in the feature amount normalization step S1000 (normalization using the standard deviation obtained in the feature amount normalization step S1000) is executed. The normalized wavelet feature vectors are projected to the linear projection space in the higher-order feature space obtained by the process up to step S1005, and their distances are obtained using Expression (8). Finally, the threshold is determined within the range of the obtained distances.

In the last projection distance threshold recording step S1007, the threshold determined in the projection distance threshold determination step S1006 is recorded in the projection rule holding unit 701. The process in step S1007 corresponds to the process in step S801 in FIG. 8. When this process is ended, the process of the projection rule generation unit 711, that is to say, the process in the projection rule generation step S810 and the projection rule recording step S801 in FIG. 8 is ended. The process in the normal pattern modeling mode is thus ended.

With the above process in the normal pattern modeling mode, the following five data are saved in the projection rule holding unit 701.

1. Standard deviation data group for feature amount normalization
2. Central data of the normal pattern
3. Kernel function value coupling weight vector group
4. Wavelet feature vector group after feature amount normalization
5. Distance threshold for determining whether a pattern is normal The first data (standard deviation data group for feature amount normalization) is the data group of the standard deviations used for feature amount normalization in the feature amount normalization step S1000. More specifically, in this embodiment, discrete wavelet transformation is performed seven times. Hence, 7×3 standard deviations corresponding to three high-frequency component extraction patterns in the respective directions in the respective times and the standard deviation of the low-frequency component pattern LL7 obtained by the seventh discrete wavelet transformation, that is to say, a total of 22 standard deviations are recorded.

The second data (central data of the normal pattern) is the central data $x_M$ of the normal pattern obtained in the central data selection step S1040 by the same method as in the central data selection step S540 of the second embodiment. In the second embodiment, one central data is recorded in correspondence with each class. In the third embodiment, however, since only one class of normal patterns is registered, only one central data is recorded. The central data $x_M$ is one of the wavelet feature vectors normalized in the feature amount normalization step S1000. Hence, the central data $x_M$ is a 16384-dimensional vector.

The third data (kernel function value coupling weight vector group) is the kernel function value coupling weight vector group $\alpha_n$ for determining a linear projection space in a higher-order feature space, which saves the layout relationship on a manifold expressing the entire normal pattern. Since one kernel function value coupling weight vector exists in correspondence with each pattern, there are 574977×N vectors. The number of dimensions of each vector is determined by the same method as in the second embodiment.

The fourth data (wavelet feature vector group after feature amount normalization) is the group of the 574977×N wavelet feature vectors normalized in the feature amount normalization step S1000. The 574977×N wavelet feature vectors correspond to the kernel function value coupling weight vectors of the third data, that is to say, kernel function value coupling weight vector group, respectively. Hence, they are recorded together with the correspondence relationship.

The fifth data (distance threshold for determining whether a pattern is normal) is the threshold obtained in the projection distance threshold determination step S1006 to finally determine whether a pattern is a normal pattern. These five data are used in the normal pattern modeling mode of this embodiment to be described below.

(Process in Abnormal Pattern Detection Mode)

The process in the abnormal pattern detection mode of this embodiment will be described next with reference to the block of the abnormal pattern detection mode 72 in FIG. 7 and the process sequence in FIG. 9, both of which show the arrangement of the abnormal pattern detection mode processing unit.

In the abnormal pattern detection mode of this embodiment, first, a projection rule input unit 720 inputs the above-described five data saved in the projection rule holding unit 701 in the normal pattern modeling mode (projection rule input step S920).

The data input unit 700 inputs inspection image data of a target for abnormality detection (data input step S900). The inspection image data input here is an image obtained by photographing the surface of a rubber plate which is an inspection target and has undergone surface roughening. In this embodiment, the inspection image data is a 1024×768 pixel gray-scale image, like the normal image data used in the normal pattern modeling mode.

Subsequently, a feature extraction process is executed (step S902 in FIG. 9). First, the feature extraction processing unit 702 extracts 48 128×128 pixel inspection patterns from the inspection image data input by the data input unit 700. In the normal pattern modeling mode, all possible 128×128 pixel patterns are extracted from a 1024×768 pixel image. In the abnormal pattern detection mode, the areas to be extracted do not overlap. For this reason, 1024/128=8 patterns are extracted in the direction of 1024 pixels, and 768/128=6 patterns are extracted in the direction of 768 pixels. A total of 8×6=48 patterns are extracted.

Discrete wavelet transformation is executed hierarchically for each of the 48 patterns. Wavelet feature vectors are generated based on the transformation result. The process of hierarchical discrete wavelet transformation and wavelet feature vector generation based on the result of transformation is the same as the process in the feature extraction process step S802 in the normal pattern modeling mode, an a description thereof will be omitted.

Feature amount normalization is executed for each of the 48 generated wavelet feature vectors using the standard deviation data group for feature amount normalization input in the projection rule input step S920. In this case, the same normalization as that in the feature amount normalization step S1000 of the normal pattern modeling mode is executed using the input standard deviation group for feature amount normalization. With this process, 48 normalized wavelet feature vectors are obtained. The above-described process corresponds to the feature amount extraction step S902 in FIG. 9.

Next, each of the 48 normalized wavelet feature vectors generated in step S902 is projected to the linear projection space in the higher-order feature space obtained in the normal pattern modeling mode, and its projection distance is obtained (step S921). A projection result calculation unit 721 executes this process. Actually, the square of the projection distance may be obtained in step S921.

The linear projection space in the higher-order feature space saves the layout relationship on a manifold expressing the entire normal pattern as much as possible, as described above. The projection distance of each normalized wavelet feature vector projected to this space is obtained using Expression (8). As the central data, kernel function value coupling weight vector group, and the like in Expression (8), the central data of the normal pattern, the kernel function value coupling weight vector group, and the wavelet feature vector group after feature amount normalization input in step S920 are used. A maximum one of the projection distances of the 48 normalized wavelet feature vectors is obtained.

Figure 9:
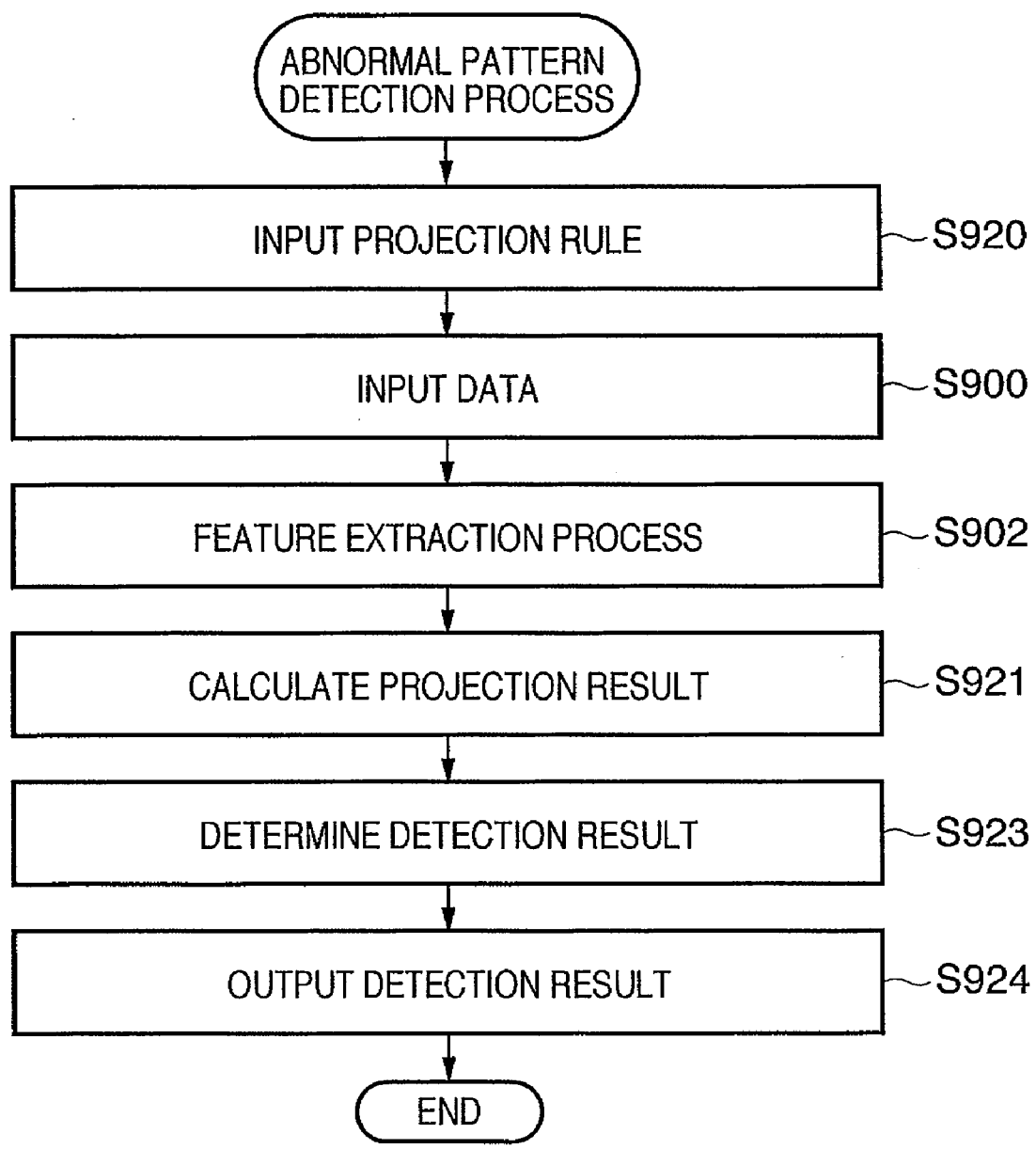
FIG. 9 is a flowchart illustrating the sequence of a process in an abnormal pattern detection mode.

The detection result is determined (step S923 in FIG. 9). A detection result determination unit 723 compares the maximum projection distance obtained in step S921 with the distance threshold for determining whether a pattern is normal, which is input in step S920. If the comparison shows that the maximum projection distance is greater than or equal to the input threshold, the detection result determination unit 723 determines that the inspection image data input by the data input unit 700 has an abnormality. Conversely, if the maximum projection distance is smaller than the input threshold, the detection result determination unit 723 determines that the inspection image data has no abnormality.

Finally, in the detection result output step S924, a detection result output unit 724 externally outputs the result indicating whether the inspection image data input by the data input unit 700 has an abnormality. That is, if the maximum projection distance is greater than or equal to the input threshold in the detection result determination step S923, the detection result output unit 724 outputs data representing that an abnormality has been detected. If the maximum projection distance is smaller than the threshold, the detection result output unit 724 outputs data representing that no abnormality has been detected.

The above process enables the process in the abnormal pattern detection mode, that is to say, the process of detecting an abnormality from inspection image data of a target for abnormality detection.

The process in the normal pattern modeling mode and the abnormal pattern detection mode allows model of a normal pattern based on a linear projection space in a higher-order feature space using a plurality of normal patterns. Then, it allows determination of the degree of separation between an unknown input pattern and the normal pattern model on the basis of the projection distance to the linear projection space in the higher-order feature space and detect an abnormal pattern.

As described above, the arrangement of abnormal pattern detection according to this embodiment first obtains a hyperplane in a higher-order feature space, which approximates a manifold structure expressing the entire data set of a normal pattern. To do this, a projection rule that approximates the layout relationship on the manifold structure and, more specifically, the geodesic distance relationship as in the second embodiment is obtained. The distance (projection distance) between the linear projection space in the higher-order feature space defined by the projection rule, that is, a degenerated hyperplane in the higher-order feature space and the image of new input data of an identification target in the higher-order feature space is obtained. The distance to the hyperplane can be regarded as the degree of separation with respect to the data set distributed on the hyperplane. It is therefore possible to determine whether the input data falls within the range of the normal pattern or is abnormal by determining whether the distance to the hyperplane obtained using the normal pattern has a predetermined value or more.

In this embodiment, an example in which a defect on the surface of a product is detected using an image obtained by photographing the surface of the product has been described. However, the present invention is not limited to such product defect detection and is also applicable to, for example, detection of an abnormality or a suspicious person from a surveillance camera image. In this case, using, for example, an optical flow, motion vector is extracted from a moving image obtained from a surveillance camera, and the obtained information is used as an input pattern. The present invention is not limited to detection using an image and is also applicable to, for example, monitor the operation state of an apparatus and detect an operation error in the apparatus using a plurality of pieces of sensor information such as the heat generation amount, vibration, and operation sound of the apparatus. In this embodiment, normal patterns are handled as one class. However, the present invention is not limited to this. For example, normal patterns may be separated into several classes by, for example, a k-averaging method. Each class is regarded as a normal class, and the same method as described above may be applied to each class.

As described above, in this embodiment, the same projection rule as in the second embodiment is generated using a data set labeled normal, and whether a newly input pattern is normal or abnormal is detected using the projection rule.

<<Other Embodiments>>

In the above-described arrangements, an evaluation criterion for saving the geodesic distance between data is used as an evaluation criterion for saving a manifold structure expressing the entire data of each class or the entire normal data, like the Tenenbaum-Silva-Langford's Isomap. However, the present invention is not limited to this. For example, an evaluation criterion for saving a linear embedding relationship with respect to neighboring data may be used, like the Roweis-Saul's LLE. Alternatively, an evaluation criterion for saving the distance relationship between neighboring data may be used, like Laplacian Eigenmaps in Mikhail Belkin and Partha Niyogi, "Laplacian Eigenmaps and Spectral Techniques for Embedding and Clustering", Advances in Neural Information Processing Systems 14, MIT Press, Cambridge Mass. 2002 (Belkin-Niyogi hereinafter), and Locally Preserving Projections in Xiaofei He and Partha Niyogi, "Locally Preserving Projections", Advances in Neural Information Processing Systems 16, MIT Press, Cambridge Mass. 2004 (He-Niyogi hereinafter).

The pattern identification method according to the above-described embodiments can also be extended to a mutual space comparison method such as a mutual subspace method in Kenichi Maeda and Teiichi Watanabe, "Pattern Matching Method Introducing Local Structure", IEICE Transactions D, Vol. J68-D No. 3, pp. 345-352, March 1985 (Maeda-Watanabe hereinafter), and a Sakano-Takegawa-Nakamura's kernel nonlinear mutual subspace method. More specifically, even in the process in the identification mode, a number of data belonging to one class are input, like the process in the registration mode. On the basis of the data, a projection rule corresponding to a number of input data using the same criterion as in the registration mode. The generated projection rule is compared with the projection rules of the respective classes, which are generated in advance, thereby identifying the class similar to the set of the plurality of input data. At this time, the canonical angle made by the projection spaces determined by the projection rules is used as the similarity. The pattern identification method can also be extended to a method of projecting each projection space to a projection space that is regarded to rarely include variation components such as an illumination variation and comparing the projection spaces, thereby identifying a similar class, as in Kazuhiro Fukui, Osamu Yamaguchi, Kaoru Suzuki, and Kenichi Maeda, "Face Image Recognition Robust Against Environmental Variations Using Constrained Mutual Subspace Method", IEICE Transactions D-II, Vol. J82-D-II No. 4, pp. 613-620, April 1999 (Fukui-Yamaguchi=Suzuki-Maeda hereinafter).

In the above-described examples of pattern identification according to the first and second embodiments, a gray-scale image of an extracted human face is input. In the abnormal pattern detection according to the third embodiment, a surface image of a metal plate which has undergone surface roughening is input. However, the present invention is not limited to this and is also applicable to image data or audio data of another category, or data obtained by extracting a feature from these data. The above-described method is also applicable to general data such as Web content if it is possible to define mapping of the data to a multidimensional space determined by the distance between data and several parameters. In this case, using an error function as indicated by Expression (1), (4), or (6), the parameters that determine mapping are defined such that the error function is minimized under presented constraints.

The embodiments of the present invention have been described above in detail. The present invention can take a form of, for example, a system, apparatus, method, program, or storage medium. More specifically, the present invention is applicable to a system including a plurality of devices or an apparatus including a single device.

The present invention is also achieved by supplying a program to implement the functions of the above-described embodiments to the system or apparatus directly or from a remote site and causing the computer of the system or apparatus to read out and execute the supplied program codes.

Hence, the program codes themselves which are installed in a computer to implement the functional processing of the present invention are also incorporated in the technical scope of the present invention. That is, the present invention also incorporates the computer program itself to implement its functional processing.

In this case, the program can take any form such as an object code, a program to be executed by an interpreter, or script data to be supplied to the OS as long as the functions of the program are available.

Examples of a recording medium to supply the program are a Floppy® disk, hard disk, optical disk, magnetooptical disk, MO, CD-ROM, CD-R, CD-RW, magnetic tape, nonvolatile memory card, ROM, and DVD (DVD-ROM, DVD-R).

The following program supply form is also available. A client apparatus may connect to a homepage on the Internet via a browser to download the computer program of the present invention or a compressed file containing an automatic installation function from the homepage to a recording medium such as an HD. The program codes contained in the program of the present invention may be divided into a plurality of files so that the user can download the files from different homepages. That is, a WWW server which causes a plurality of users to download the program file to implement the functional processing of the present invention is also incorporated in the present invention.

The following supply form is also available. The program of the present invention is encrypted, stored in a storage medium such as a CD-ROM, and distributed to users. Any user who satisfies predetermined conditions can download key information to decrypt the program from a homepage via the Internet. The user executes the encrypted program by using the key information and install the program in the computer. Such a supply form is also possible.

The functions of the above-described embodiments are implemented not only when the computer executes the readout program but also when, for example, the OS running on the computer partially or wholly executes actual processing on the basis of the instructions of the program.

The functions of the above-described embodiments are also implemented when the program read out from the recording medium is written in the memory of a function expansion board inserted into the computer or a function expansion unit connected to the computer and executed. That is, the CPU of the function expansion board or function expansion unit partially or wholly executes actual processing, thereby implementing the functions of the above-described embodiments.

As described above, according to the present invention, it is possible to provide a pattern recognition technique having a further improved robustness against variations in input data. It is also possible to provide an abnormal pattern detection technique using the pattern recognition technique.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-104212, filed Apr. 11, 2007, which is hereby incorporated by reference herein in its entirety.

What is claimed is:

1. A pattern identification apparatus for identifying one of a plurality of classes defined in advance, to which data of a pattern identification target belongs, comprising:
a read unit adapted to read out, from a storage unit in correspondence with each of the plurality of classes, a projection rule to a hyperplane which approximates a manifold corresponding to the class in a feature space;
an input unit adapted to input identification target data;
a calculation unit adapted to calculate, for each class, a projection result obtained by projecting the input identification target data to the hyperplane which approximates the manifold corresponding to each of the plurality of classes, on the basis of the projection rule; and
an identification unit adapted to identify, on the basis of the projection result of each classes calculated by said calculation unit, one of the plurality of classes to which the identification target data belongs.

2. The apparatus according to claim 1, wherein the hyperplane approximates, as an Euclidean distance, a geodesic distance on the manifold between data belonging to a corresponding class.

3. The apparatus according to claim 1, wherein the hyperplane approximates at least one of a layout relationship, a linear coupling relationship, and a distance between data which are in close vicinity to each other and belong to a corresponding class.

4. The apparatus according to claim 1, wherein said calculation unit calculates one of a projection length and a projection distance as the projection result.

5. The apparatus according to claim 1, further comprising a generation unit adapted to generate the projection rule, said generation unit generating a projection rule which minimizes a difference between a Euclidean distance between data on the hyperplane and a geodesic distance between corresponding data on the manifold approximated by the hyperplane.

6. The apparatus according to claim 5, wherein said generation unit generates, as the projection rule, a linear mapping matrix A which minimizes, under a condition ATA=I, an error function J(A) given by $$J(A) = \frac{1}{2} \cdot \frac{1}{\sum_{i<j} d_M(i,j)} \sum_{i<j} \frac{(|A^T x_i - A^T x_j| - d_M(i,j))^2}{d_M(i,j)}$$

where $x_i$ and $x_j$ are ith and jth data belonging to a single class, and $d_M(i,j)$ is the geodesic distance between the ith data and the jth data.

7. The apparatus according to claim 5, wherein said generation unit generates $\phi(x)$ which is a nonlinear mapping represented by $\phi(x) = \Sigma \alpha_n \cdot K(x, x_n)$ as the projection rule using a kernel function $K(\xi, \zeta)$ which is a real symmetric function satisfying a positive semidefinite characteristic, and data $x_n$ (n=1, 2, ... ) belonging to a single class.

8. The apparatus according to claim 7, further comprising:
a determination unit adapted to determine whether to change the kernel function, on the basis of the Euclidean distance between the data on the hyperplane and the geodesic distance between the corresponding data on the manifold approximated by the hyperplane; and a change unit adapted to change at least one of a function shape and a parameter of the kernel function when said determination unit has determined to change the kernel function.

9. The apparatus according to claim 8, wherein said determination unit determines to change the kernel function when a magnitude relationship of Euclidean distances between three data on the hyperplane does not match a magnitude relationship of geodesic distances between three corresponding data on the manifold approximated by the hyperplane.

10. An abnormal pattern detection apparatus comprising:
a read unit adapted to read out, from a storage unit, a projection rule to a hyperplane which approximates a manifold corresponding to a class defined in advance in a feature space;
an input unit adapted to input process target data;
a calculation unit adapted to calculate a projection result obtained by projecting the input process target data to the hyperplane which approximates the manifold corresponding to the class, on the basis of the projection rule; and
a detection unit adapted to detect, on the basis of the projection result calculated by said calculation unit, whether the process target data is abnormal.

11. The apparatus according to claim 10, wherein said detection unit executes the detection based on at least one of a projection length and a projection distance of the projection result.

12. A pattern identification method for identifying one of a plurality of classes defined in advance, to which data of a pattern identification target belongs, comprising the steps of:
reading out, from a storage unit in correspondence with each of the plurality of classes, a projection rule to a hyperplane which approximates a manifold corresponding to the class in a feature space;
inputting identification target data;
calculating, for each class, a projection result obtained by projecting the input identification target data to the hyperplane which approximates the manifold corresponding to each of the plurality of classes, on the basis of the projection rule; and
identifying, on the basis of the projection result of each class calculated in the step of calculating, one of the plurality of classes to which the identification target data belongs.

13. An abnormal pattern detection method comprising the steps of:
reading out, from a storage unit, a projection rule to a hyperplane which approximates a manifold corresponding to a class defined in advance in a feature space;
inputting process target data;
calculating a projection result obtained by projecting the input process target data to the hyperplane which approximates the manifold corresponding to the class, on the basis of the projection rule; and
detecting, on the basis of the projection result calculated in the step of calculating, whether the process target data is abnormal.

14. A non-transitory computer-readable storage medium storage a program which causes a computer to function as a pattern identification apparatus of claim 1.

15. A non-transitory computer-readable storage medium storage a program which causes a computer to function as an abnormal pattern detection apparatus of claim 10.

* * * * *